United States Patent
Wang et al.

(10) Patent No.: US 11,803,383 B2
(45) Date of Patent: *Oct. 31, 2023

(54) METHOD AND SYSTEM FOR EXECUTING NEW INSTRUCTIONS

(71) Applicant: Shanghai Zhaoxin Semiconductor Co., Ltd., Shanghai (CN)

(72) Inventors: Weilin Wang, Beijing (CN); Mengchen Yang, Beijing (CN); Yingbing Guan, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,440

(22) Filed: Sep. 10, 2021

(65) Prior Publication Data
US 2022/0206813 A1 Jun. 30, 2022

(30) Foreign Application Priority Data

Dec. 29, 2020 (CN) .......................... 202011591546.0
Dec. 29, 2020 (CN) .......................... 202011591845.4

(51) Int. Cl.
G06F 9/30 (2018.01)
G06F 9/448 (2018.01)
G06F 9/38 (2018.01)

(52) U.S. Cl.
CPC ...... *G06F 9/30149* (2013.01); *G06F 9/30047* (2013.01); *G06F 9/3861* (2013.01); *G06F 9/4486* (2018.02)

(58) Field of Classification Search
CPC ............ G06F 9/30149; G06F 9/30047; G06F 9/3861; G06F 9/4486; G06F 9/455
See application file for complete search history.

(56) References Cited

U.S. PATENT DOCUMENTS

| | | | |
|---|---|---|---|
| 4,839,797 A | 6/1989 | Katori et al. | |
| 4,873,629 A | 10/1989 | Harris et al. | |
| 5,630,052 A | 5/1997 | Shah | |
| 5,701,442 A | 12/1997 | Ronen | |
| 5,781,750 A * | 7/1998 | Blomgren | G06F 9/30167 712/E9.035 |
| 5,794,063 A | 8/1998 | Favor | |
| 5,838,987 A | 11/1998 | Brightman et al. | |

(Continued)

OTHER PUBLICATIONS

Non-Final Office Action dated Jun. 27, 2022, issued in U.S. Appl. No. 17/471,343.

(Continued)

*Primary Examiner* — Corey S Faherty
(74) *Attorney, Agent, or Firm* — McClure, Qualey & Rodack, LLP

(57) ABSTRACT

A method for executing new instructions is provided. The method is used in a processor and includes: receiving an instruction; when the received instruction is an unknown instruction, the processor executes the following steps through a conversion program: determining whether the received instruction is a new instruction; and converting the received instruction into at least one old instruction when the received instruction is a new instruction; and simulating the execution of the received instruction by executing the at least one old instruction.

26 Claims, 23 Drawing Sheets

(56) References Cited

U.S. PATENT DOCUMENTS

| | | |
|---|---|---|
| 5,881,258 A | 3/1999 | Arya |
| 5,896,519 A | 4/1999 | Worrell |
| 5,909,567 A | 6/1999 | Novak et al. |
| 5,983,337 A * | 11/1999 | Mahalingaiah ....... G06F 9/3017 712/226 |
| 6,093,213 A | 7/2000 | Favor et al. |
| 6,496,922 B1 | 12/2002 | Borrill |
| 6,711,667 B1 | 3/2004 | Ireton |
| 6,928,536 B2 | 8/2005 | Duesterwald et al. |
| 7,831,807 B1 | 11/2010 | Johnson et al. |
| 9,442,794 B1 | 9/2016 | Tian |
| 9,563,424 B2 | 2/2017 | Sehr et al. |
| 9,594,927 B2 | 3/2017 | Zimmer et al. |
| 2001/0010072 A1 | 7/2001 | Yoshida |
| 2003/0221035 A1 | 11/2003 | Adams |
| 2004/0111717 A1 | 6/2004 | Abdulhayoglu |
| 2008/0216073 A1 | 9/2008 | Yates et al. |
| 2008/0282241 A1 | 11/2008 | Dong |
| 2009/0158015 A1 | 6/2009 | Hillman et al. |
| 2009/0204785 A1 | 8/2009 | Yates, Jr. et al. |
| 2009/0222654 A1 | 9/2009 | Hum et al. |
| 2010/0058034 A1 | 3/2010 | Zaks |
| 2010/0192137 A1 | 7/2010 | Inglis et al. |
| 2011/0093627 A1 | 4/2011 | De et al. |
| 2012/0260042 A1 | 10/2012 | Henry et al. |
| 2013/0246768 A1 | 9/2013 | Gschwind |
| 2013/0305013 A1 | 11/2013 | Ebersole |
| 2014/0129808 A1 | 5/2014 | Naveh et al. |
| 2014/0281399 A1 | 9/2014 | Rash et al. |
| 2014/0304493 A1 | 10/2014 | Zhong et al. |
| 2015/0356297 A1 | 12/2015 | Guri et al. |
| 2016/0026482 A1 | 1/2016 | Abdallah |
| 2016/0026486 A1 | 1/2016 | Abdallah |
| 2016/0070932 A1 | 3/2016 | Zimmer et al. |
| 2016/0092236 A1 | 3/2016 | Kanapathipaillai et al. |
| 2017/0134347 A1 | 5/2017 | Kupreev et al. |
| 2018/0159747 A1 | 6/2018 | Chang et al. |
| 2018/0322313 A1 | 11/2018 | Yao et al. |
| 2019/0034316 A1 | 1/2019 | Levit-Gurevich et al. |
| 2019/0043159 A1 | 2/2019 | Levit-Gurevich et al. |
| 2019/0220279 A1 | 7/2019 | McNeeney et al. |
| 2019/0391904 A1 | 12/2019 | Sabharwal et al. |
| 2020/0073643 A1 | 3/2020 | Tsirkin |
| 2020/0082491 A1 | 3/2020 | Harris |
| 2021/0117251 A1 | 4/2021 | Cristofi et al. |
| 2021/0182724 A1 | 6/2021 | Zou et al. |
| 2021/0397425 A1 | 12/2021 | Zwarich et al. |
| 2022/0066933 A1 | 3/2022 | Kamand et al. |
| 2022/0100527 A1 | 3/2022 | Viste et al. |
| 2022/0197678 A1 | 6/2022 | Poornachandran et al. |
| 2022/0206794 A1 | 6/2022 | Wang et al. |
| 2022/0206808 A1 | 6/2022 | Wang et al. |
| 2022/0206810 A1 | 6/2022 | Wang et al. |
| 2022/0206812 A1 | 6/2022 | Wang et al. |
| 2022/0206813 A1 | 6/2022 | Wang et al. |
| 2022/0206815 A1 | 6/2022 | Wang et al. |
| 2023/0221957 A1 | 7/2023 | Pool et al. |

OTHER PUBLICATIONS

Notice of Allowance dated Jul. 11, 2022, issued in U.S. Appl. No. 17/471,387.

Notice of Allowance dated Oct. 19, 2022, issued in U.S. Appl. No. 117/471,400.

Non-Final Office Action dated Oct. 5, 2022, issued in U.S. Appl. No. 17/471,423.

Non-Final Office Action dated Oct. 31, 2022, issued in U.S. Appl. No. 17/471,167.

Notice of Allowance dated Jul. 25, 2023, issued in U.S. Appl. No. 17/471,423.

Non-Final Office Action dated Jan. 19, 2023, issued in U.S. Appl. No. 17/471,454.

Non-Final Office Action dated Jan. 26, 2023, issued in U.S. Appl. No. 17/471,371.

Notice of Allowance dated Jun. 22, 2023, issued in U.S. Appl. No. 17/471,454.

Non-Final Office Action dated Dec. 1, 2022, issued in U.S. Appl. No. 17/471,170.

Non-Final Office Action dated Dec. 21, 2022, issued in U.S. Appl. No. 17/471,359.

Non-Final Office Action dated Jul. 18, 2023, issued in U.S. Appl. No. 17/471,371.

Final Office Action dated Mar. 16, 2023, issued in U.S. Appl. No. 17/471,170.

Non-Final Office Action dated Apr. 13, 2023, issued in U.S. Appl. No. 17/471,423.

Final Office Action dated Apr. 18, 2023, issued in U.S. Appl. No. 17/471,454.

* cited by examiner

METHOD AND SYSTEM FOR EXECUTING NEW INSTRUCTIONS

CROSS REFERENCE TO RELATED APPLICATIONS

This Application claims priority of China Patent Application No. 202011591845.4, filed on Dec. 29, 2020, China Patent Application No. 202011591546.0, filed on Dec. 29, 2020, the entirety of which is incorporated by reference herein.

BACKGROUND

Technical Field

The present disclosure generally relates to the field of microelectronics. More specifically, aspects of the present disclosure relate to a method and system for executing new instructions and converting instructions.

Description of the Related Art

Processor technology has developed rapidly over the years. With the enhancement of processor functions, subsequent-generation processors will often add new instructions on the basis of previous-generation processors. Since the previous-generation processors cannot execute the new instructions supported by the subsequent-generation processors, an unknown instruction exception (#UD) will be generated when the previous-generation processors execute the new instructions, wherein the unknown instruction exception may cause the process containing the new instructions to be terminated by the operating system, and cause the application or operating system containing the new instructions to be unable to execute on the previous-generation processors.

Therefore, there is a need for a method and system for executing new instructions to achieve the purpose of executing new instructions on previous-generation processors.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and system for executing new instructions, so as to achieve the purpose of executing new instructions without changing the hardware architecture of the previous-generation processing core.

In an exemplary embodiment, a method for executing new instructions comprising: receiving an instruction; when the received instruction is an unknown instruction, the processor executes the following steps through a conversion program: determining whether the received instruction is a new instruction; and converting the received instruction into at least one old instruction when the received instruction is a new instruction; and simulating the execution of the received instruction by executing the at least one old instruction.

In an exemplary embodiment, a system for executing new instructions, comprising: an instruction decoding unit, receiving an instruction, and determining whether the received instruction is an unknown instruction, when the received instruction is an unknown instruction, the system for executing the new instructions uses a conversion program to execute the following steps: converting the received instruction into at least one old instruction when the received instruction is a new instruction; wherein the system for executing the new instructions simulates the execution of the received instruction by executing the at least one old instruction.

Through the method and the system for executing new instructions provided in the present disclosure, new instructions can be executed on the previous-generation processors without modifying the hardware architecture of the processing cores.

BRIEF DESCRIPTION OF DRAWINGS

The accompanying drawings are included to provide a better understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Figure 1:
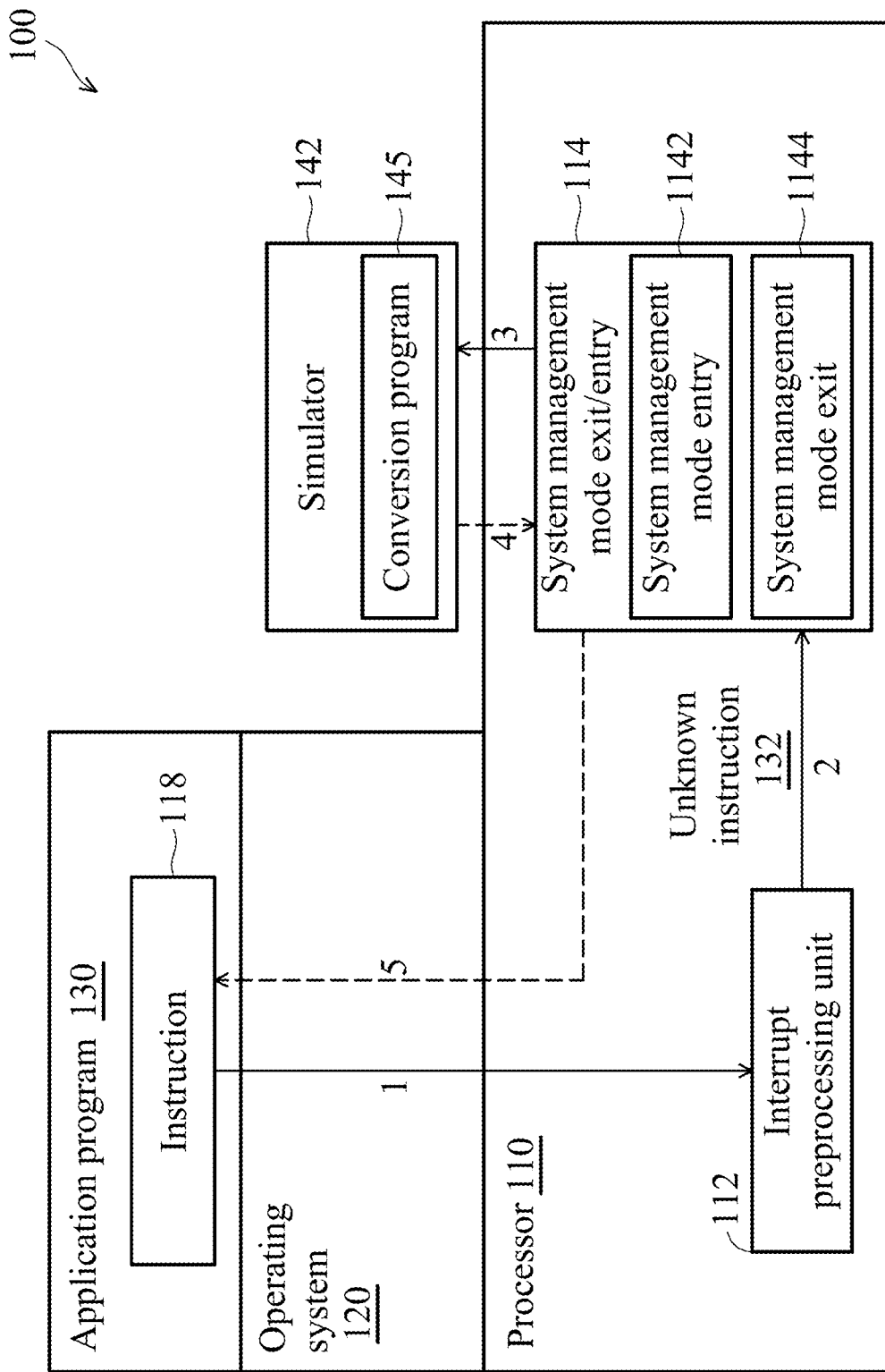
FIG. 1 shows a schematic diagram of a system for executing new instructions in accordance with one embodiment of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

In order to better describe the embodiments of the present disclosure, the specific terms used in the present disclosure are firstly defined as below.

Old instructions: the instructions natively supported by previous-generation processors are called native instructions, also known as existing instructions or old instructions.

Unknown instructions: instructions not natively supported by previous-generation processors.

New instruction: compared with a previous-generation processor, the instruction newly supported by the subsequent-generation processor. The new instruction cannot be recognized by the previous-generation processor, so it is an unknown instruction to the previous-generation processor.

New architecture registers: compared with the previous-generation processors, the new architecture registers supported by the subsequent-generation processors. The new architecture register does not exist in the previous-generation processor. Therefore, when the new instruction using the new architecture register is simulated and executed on the previous-generation processor, the new architecture register needs to be simulated.

Unrecognized instructions: among unknown instructions, the remaining part of the instructions after the new instructions is removed. That is, unrecognized instructions refer to instructions that are not natively supported by subsequent-generation processors.

Model specific register: a type of register in the processor that can be used to perform some specific functions.

Traps: traps are generally caused by soft interrupt instructions (such as INT instruction). When an instruction causes a trap exception, it does not mean that there is an error in the execution of the instruction itself. Therefore, when an instruction causes a trap exception, the processor will continue to execute the next instruction of this instruction. For example, when a software developer debugs the software code, he/she can set breakpoints in the code. When program code with a breakpoint is executed on the processor, and when the execution reaches the breakpoint, a trap will be generated, so that the execution of the program code will be suspended at the breakpoint. Software developers can view the value of each architecture register in the processor or the value of each variable in the program code through the microcode handler that handles the trap when the program code is executed to a breakpoint. According to the value of each structure register or the value of each variable in the program code, it is determined whether the program code is executed normally when the execution reaches the breakpoint.

In addition, in this specification, the simulation and the emulation have the same meanings, and the simulator and the emulator have the same meanings, and simulate and emulate have the same meanings.

The processor of the present disclosure can be a processor with reduced instruction set computing (RISC) (such as ARM/MIPS/RISC-V instruction set), complex instruction set computing (CISC) (such as x86 instruction set), or processors of other types of instruction set, or a processor that can support multiple different instruction set architectures at the same time (for example, a processor that support both x86 instruction set and ARM instruction set). The type of instruction set supported by the processor is not particularly limited in the present disclosure, but for the convenience of description, a processor supporting the X86 instruction set is used to describe the embodiments of the present disclosure. In addition, as is well known to those skilled in the art, the x86 processor interprets macroinstructions into at least one microinstruction or sequence of microinstructions according to the sequence of the original program. However, the execution of microinstructions is performed in an out-of-order manner to improve execution efficiency, but the retire process after the microinstructions are executed is still performed according to the sequence of the original program.

There are a variety of embodiments in the present disclosure. The following four examples are used to describe the four main embodiments of the present disclosure. The first embodiment describes the implementation of simulating the execution of new instructions in the system management mode. The second embodiment describes the implementation of simulating the execution of the new instruction in the same execution mode as the new instruction. The third embodiment and the fourth embodiment describe the implementation of simulating the execution of the new instruction through the operating system, wherein a dedicated processing core is used to complete the conversion operation of the new instruction in the fourth embodiment. The first embodiment will be described first.

First Embodiment

FIG. 1 shows a schematic diagram of a system 100 for executing new instructions in accordance with one embodiment of the present disclosure. As shown in FIG. 1, the system 100 for executing new instructions includes a processor 110, an operating system 120, an application program 130, and a simulator 142. The operating system 120 runs on the processor 110 and is used to manage the processor 110. The application program 130 runs on the operating system 120, and can use various functions provided by the processor 110 and other hardware (not shown, such as a hard disk, a network card, etc.) through the operating system 120. The simulator 142 runs on the processor 110 in a system management mode (SMM). The operating system 120 or the application program 130 cannot perceive the execution process of the simulator 142. That is, all operations performed by the simulator 142 are transparent to the operating system 120 or the application 130.

When the processor 110 executes an unknown instruction of the application 130 or the operating system 120, the processor 110 enters the system management mode and sends the unknown instruction to the simulator 142 for processing. When the unknown instruction is a new instruction, the simulator 142 will simulate and execute the new instruction. It should be noted that the source code of the application 130 or the operating system 120 is generally written in a high-level language (such as C language, C++ language, etc.) and/or a low-level language (such as assembly language, etc.). After the source code is compiled with a compiler, executable code that can be executed by the processor is generated. Executable code consists of instructions that can be directly executed by the processor. In the present disclosure, the application program 130 or the operating system 120 refers to the executable code generated after the source code of the application program 130 or the operating system 120 is compiled by a compiler. In the following, the processing of the unknown instruction 132 by the processor 110 in FIG. 1 may be taken as an example to briefly describe the processing procedure of the system 100 for executing the new instructions.

As shown in FIG. 1, the processor 110 comprises an interrupt preprocessing unit 112 and a system management mode exit/entry 114. The system management mode exit/entry 114 comprises a system management mode entry 1142 and a system management mode exit 1144. In FIG. 1, the solid arrow with a digital number indicates the transmission direction of instruction information, and the dashed arrow with a digital number indicates the transmission direction of the instruction simulation execution result. The entire process of the processor 110 processing the unknown instruction 132 is described below.

First, the processor 110 receives an instruction 118 in the application 130 to complete a specified function (as shown by the solid arrow 1). After receiving the instruction 118, the processor 110 determines whether the instruction 118 is an unknown instruction 132. When the instruction 118 is an unknown instruction 132, the processor 110 generates an unknown instruction exception (#UD). In response to the unknown instruction exception, the interrupt preprocessing unit 112 executes a microcode processing procedure for the unknown instruction exception. In the microcode processing procedure for the unknown instruction exception, the interrupt preprocessing unit 112 sets a emulation flag and generates a system management interrupt (#SMI), and at the same time sends the instruction information of the unknown instruction 132 to the system management mode exit/entry 114 (as shown by the solid arrow 2). How to generate unknown instruction exceptions and system management interrupts is the common knowledge of those skilled in the art, so the details will be omitted. In an embodiment, the processor 110 is a processor supporting the x86 instruction set, and the interrupt preprocessing unit 112 is a microcode control unit. In actual operation, those skilled in the art can modify the microcode processing procedure of the unknown instruction exception stored in the interrupt preprocessing unit 112 to add the function of setting the emulation flag, obtaining the instruction information of the unknown instruction, and generating the system management interrupt. Since these microcodes are different depending on the processor version, those skilled in the art may write corresponding microcodes according to actual conditions.

Then, the processor 110 enters the system management mode by executing the system management mode entry 1142, and sends the instruction information of the unknown instruction 132 to the simulator 142 (as shown by the solid arrow 3). In the system management mode, the simulator 142 determines whether the unknown instruction 132 is a new instruction. When the unknown instruction 132 is a new instruction, the simulator 142 simulates the execution of the new instruction. After simulating the execution of the new instruction, the simulator 142 sends the simulation execution result to the system management mode exit/entry 114 (as shown by the dashed arrow 4). Then, the processor 110 sends the simulation execution result to the application program 130 through the system management mode exit 1144 (as shown by the dotted arrow 5), and exits the system management mode. Therefore, the processor 110 has processed the unknown instruction 132. In one embodiment, the simulator 142 may store the intermediate calculation results generated during the simulation execution into the system management memory (SMRAM) during the process of simulating the execution of the new instruction.

Figure 2:
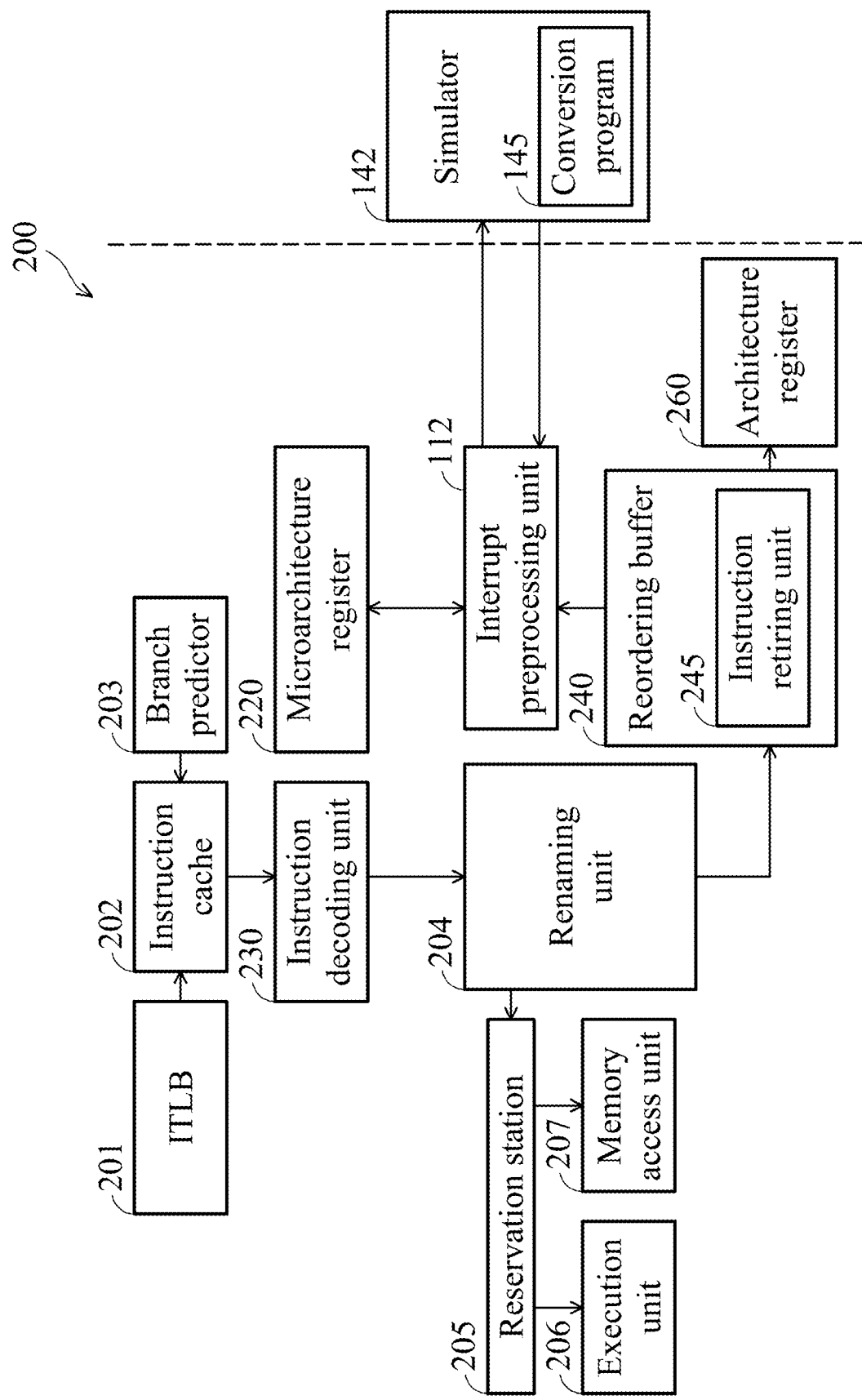
FIG. 2 is a block diagram of the processor in accordance with one embodiment of the present disclosure.

FIG. 2 is a block diagram of the processor in accordance with one embodiment of the present disclosure. As shown in FIG. 2, the processor 200 on the left of the dotted line is a structural diagram of the processor 110 shown in FIG. 1, and the simulator 142 and the conversion program 145 on the right of the dotted line run on the processor 200 in the system management mode. In an embodiment, the functions performed by the conversion program 145 are implemented in a conversion module, or the conversion program 145 can also be regarded as a conversion module in the system 100 that executes the new instructions.

As shown in FIG. 2, the processor 200 comprises an instruction translation lookaside buffer (ITLB) 201, an instruction cache 202, and a branch predictor 203. When the processor 200 executes an instruction in the application 130 or the operating system 120, the instruction translation lookaside buffer 201 of the processor 200 receives the address of the instruction. The branch predictor 203 is used to predict the conditional branch and transmit the branch prediction result to the instruction cache 202. The instruction cache 202 obtains the address of the received instruction from the instruction translation lookaside buffer 201 according to the branch prediction result, and then the processor 200 performs further processing on the received instruction.

As shown in FIG. 2, the processor 200 further comprises an instruction decoding unit 230. The instruction decoding unit 230 determines whether the received instruction is an unknown instruction, and then generates at least one microinstruction, wherein the microinstruction comprises an unknown instruction identifier, which is used to indicate whether the received instruction is an unknown instruction. When the unknown instruction identifier is the first value, it means that the received instruction is an unknown instruction. When the unknown instruction identifier is the second value, it means that the received instruction is an old instruction. In one embodiment, the first value is 1, and the second value is 0.

The processor 200 also comprises a renaming unit 204, a reservation station 205, an execution unit 206, a memory access unit 207, and a reordering buffer 240, the interrupt preprocessing unit 112, and the architecture register 260. After the renaming unit 204 receives the microinstruction from the instruction decoding unit 230, the renaming unit 204 renames the received microinstruction, wherein the microinstruction comprises an unknown instruction identifier (UD). Then, the renaming unit 204 sends the renamed microinstruction to the reservation station 205 and the reordering buffer 240. The reservation station 205 sends the microinstruction to the execution unit 206 or the memory access unit 207 for further processing according to the type of the microinstruction. After the reordering buffer 240 receives the microinstruction, the reordering buffer 240 stores the microinstruction in an instruction entry. The reordering buffer 240 comprises multiple instruction entries, and each instruction entry comprises an unknown instruction identifier field, which is used to store the unknown instruction identifier in the microinstruction.

The reordering buffer 240 comprises an instruction retiring unit 245. When the microinstruction satisfies the retire condition, the instruction retiring unit 245 retires the microinstruction. In the process of retiring the microinstruction, when the microinstruction is executed without exception, the instruction retiring unit 245 updates the architecture register 260 according to the execution result of the microinstruction. When an exception occurs during the execution of the microinstruction, the instruction retiring unit 245 reports the exception. In response to the exception, the processor 200 executes the microcode handler of the exception.

In the process of retiring the microinstruction, the instruction retiring unit 245 generates an unknown instruction exception (#UD) when the unknown instruction identifier of the microinstruction is the first value. In response to the unknown instruction exception, the processor 200 executes a microcode handler of the unknown instruction exception. In the microcode handler of the unknown instruction exception, the processor 200 stores an emulation flag whose value is the first value in the microarchitecture register 220 and generates a system management interrupt (#SMI). In response to the system management interrupt, the processor 200 may enter the system management mode through the system management mode entry 1142 shown in FIG. 1 according to the emulation flag stored in the microarchitecture register 220. In the system management mode, the processor 200 processes the received instruction through the simulator 142. First, the simulator 142 determines whether the received instruction is a new instruction. When the received instruction is a new instruction, the simulator 142 may simulate the execution of the received instruction. In the process of simulating the execution of the received instruction, the simulator 142 may store the intermediate calculation result in the system management memory (SM-RAM). It should be noted that when the emulation flag is the first value, it means that the simulator 142 is required to process the received instruction. When the emulation flag is the second value, it means that the simulator 142 is not required to process the received instruction.

After the simulator 142 processes the received instruction, the processor 200 exits the system management mode by executing the system management mode exit 1144 as shown in FIG. 1. The system management mode exit 1144 sets the emulation flag stored in the microarchitecture register 220 to the second value, and then exits the system management mode. When the processor 200 executes another received instruction, and the another received instruction is an unknown instruction, the processor 200 may set the emulation flag stored in the microarchitecture register 220 to the first value during the processor 200 executes the microcode handler of the unknown instruction exception. Then, the processor 200 processes the another received instruction according to the processing procedure as described above.

Figure 3:
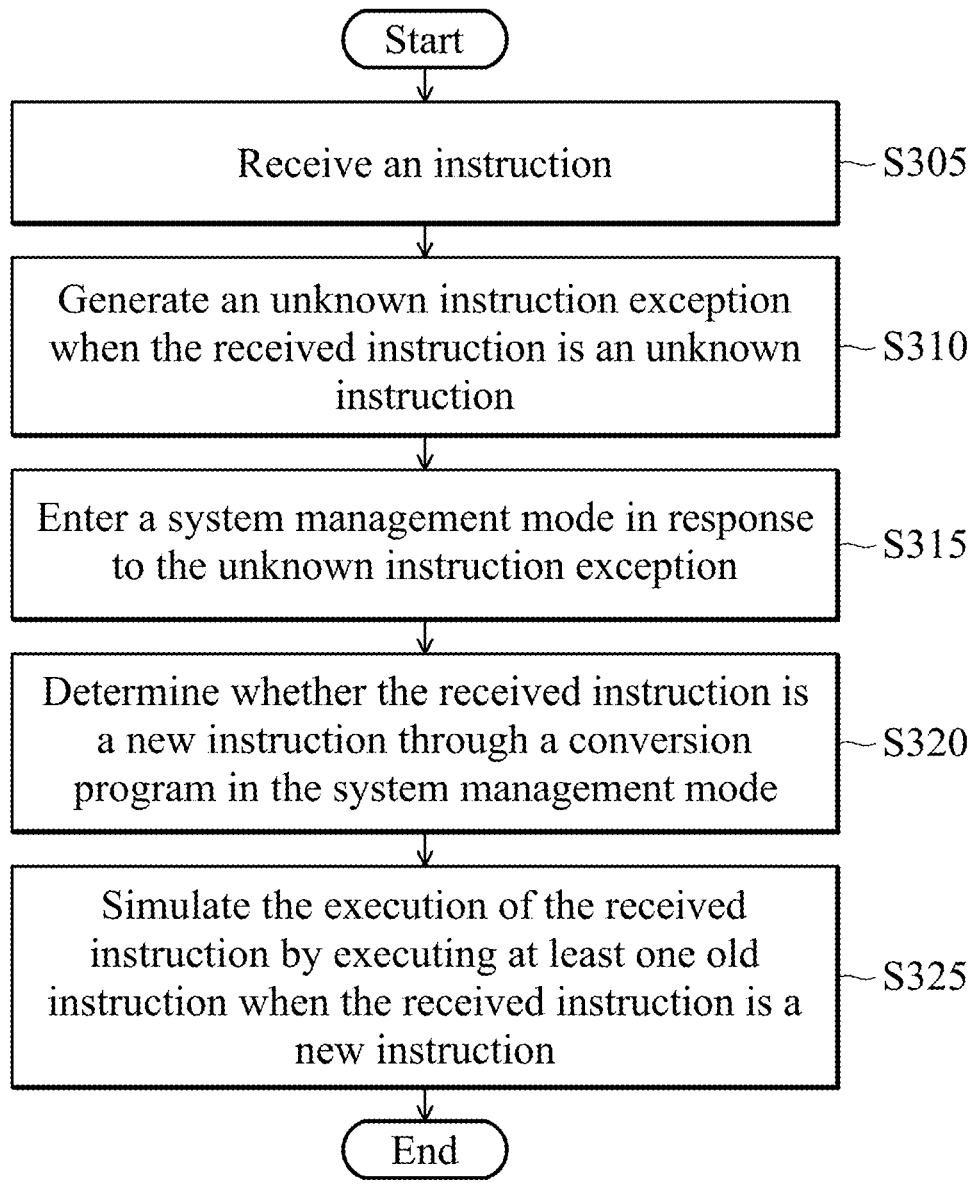
FIG. 3 is a flowchart showing the execution of the new instruction according to the first embodiment of the present disclosure.

FIG. 3 is a flowchart showing the execution of the new instruction according to the first embodiment of the present disclosure. Please refer to both FIGS. 2 and 3. As shown in FIG. 3, the instruction decoding unit 230 receives an instruction (S305). When the received instruction is an unknown instruction, the instruction retiring unit 245 generates an unknown instruction exception (S310). In response to the unknown instruction exception, the processor 200 enters a system management mode (S315), and determines whether the received instruction is a new instruction through a conversion program (S320). When the received instruction is a new instruction, the processor 200 simulates the execution of the received instruction by executing at least one old instruction (S325). The detailed description is as follows: the instruction decoding unit 230 first executes step S305.

In step S305, the instruction decoding unit 230 receives an instruction. Specifically, the instruction decoding unit 230 receives the instruction from the instruction cache 202. Then, the processor 200 executes step S310.

In step S310, when the received instruction is an unknown instruction, the instruction retiring unit 245 generates an unknown instruction exception. Specifically, as described above, after the instruction decoding unit 230 determines that the received instruction is an unknown instruction, the instruction decoding unit 230 generates a microinstruction, wherein the microinstruction comprises an unknown instruction identifier whose value is a first value. Then, the instruction decoding unit 230 sends the microinstruction to the renaming unit 204. The renaming unit 204 performs renaming processing on the microinstruction, and then sends the microinstruction to the reordering buffer 240. The reordering buffer 240 stores the microinstruction in an instruction entry. When the microinstruction satisfies the retire condition, the instruction retiring unit 245 reads the microinstruction from the instruction entry, and retires the microinstruction. Since the unknown instruction identifier of the microinstruction is the first value, the instruction retiring unit 245 generates an unknown instruction exception. Then, the processor 200 executes step S315.

In step S315, in response to the unknown instruction exception, the processor 200 enters a system management mode (SMM). Specifically, in response to the unknown instruction exception, the processor 200 executes a microcode handler of the unknown instruction exception. In the microcode handler of the unknown instruction exception, the processor 200 writes an emulation flag (EF) whose value is the first value into the microarchitecture register 220, and generates a system management interrupt (#SMI). In response to the system management interrupt, the processor 200 enters the system management mode according to the emulation flag through the system management mode entry 1142 shown in FIG. 1. Then, step S320 is executed.

In step S320, in the system management mode, the processor 200 determines whether the received instruction is a new instruction through a conversion program. As for how the conversion program determines whether the received instruction is a new instruction, the following will describe in detail with reference to FIG. 7. In one embodiment, the conversion program may be pre-stored in a basic input output system (BIOS). Those skilled in the art know that the basic input output system may be executed when the system 100 for executing new instructions is started up. The basic input output system comprises the codes for initializing the system management mode. When the system 100 for executing new instructions executes the codes for initializing the system management mode, the conversion program is loaded into the system management memory (SMRAM). Then, the processor 200 may directly execute the conversion program stored in the system management memory after entering the system management mode. Then, the processor 200 executes step S325.

In step S325, when the received instruction is a new instruction, the processor 200 simulates the execution of the received instruction by executing at least one old instruction. Specifically, when the received instruction is a new instruction, the processor 200 first converts the received instruction into at least one old instruction through the conversion program. Then, the processor 200 executes the at least one old instruction. For a more detailed description, refer to the description of steps S615, S620, S625, and S630 in FIG. 6 below.

In an embodiment, the received instruction is an instruction set architecture instruction, and the at least one old instruction is an instruction set architecture instruction. In another embodiment, the received instruction is an x86 instruction, an ARM instruction, a RISC-V instruction, or a MIPS instruction, and the at least one old instruction is an x86 instruction, an ARM instruction, a RISC-V instruction, or a MIPS instruction.

Figure 4:
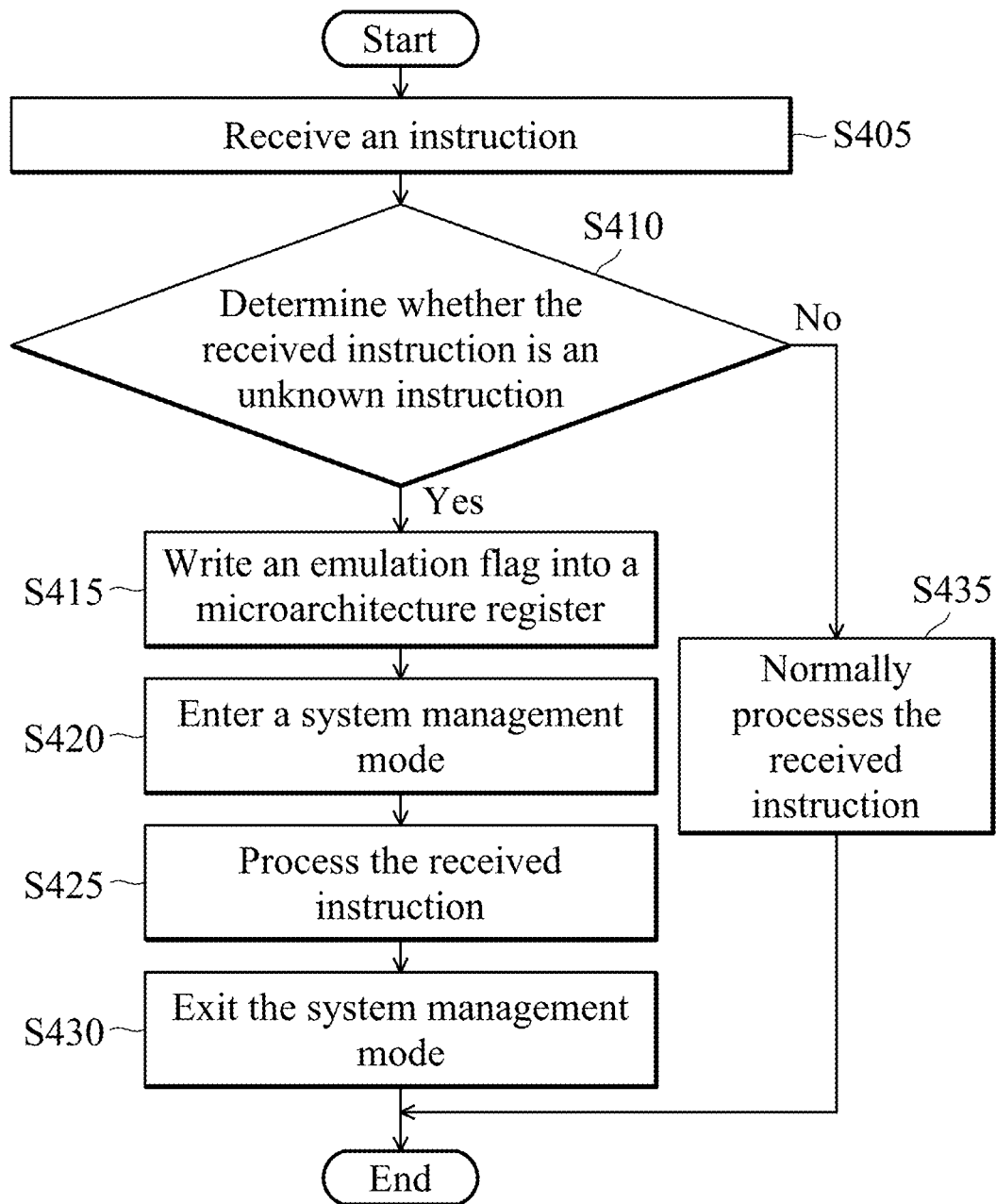
FIG. 4 shows a flowchart of processing the received instruction according to the first embodiment of the present disclosure.

FIG. 4 shows a flowchart of processing the received instruction according to the first embodiment of the present disclosure. Please refer to both FIG. 2 and FIG. 4. As shown in FIG. 4, the instruction decoding unit 230 receives an instruction (S405), and determines whether the received instruction is an unknown instruction (S410). When the received instruction is an unknown instruction, the processor enters the system management mode to process the received instruction. Since step S405 is the same as step S305 in FIG. 3, the details of step S405 will be omitted. Step S410 is described below.

In step S410, the instruction decoding unit 230 determines whether the received instruction is an unknown instruction. Specifically, the instruction decoding unit 230 decodes the received instruction to obtain decoding information of the received instruction. In one embodiment, the decoding information comprises a prefix, an escape code, an operation code (opcode), an operand mode (ModR/M), other decoding information, and so on. Then, the instruction decoding unit 230 determines whether the received instruction is an unknown instruction according to the decoding information. For example, the operation codes of the old instructions natively supported by the processor 110 may be stored in a lookup table. The instruction decoding unit 230 may check whether the operation code of the received instruction is stored in the lookup table. When the operation code of the received instruction is stored in the lookup table, it means that the received instruction is an old instruction; otherwise, it means that the received instruction is an unknown instruction. In an embodiment, the lookup table is stored in the instruction decoding unit 230.

When the received instruction is an old instruction ("No" in step S410), step S435 is executed. In step S435, the processor 200 normally processes the received instruction. As for how to process the received instruction normally, such as converting the old instruction into the corresponding microinstruction, and executing the corresponding microinstruction, it is the common knowledge of those skilled in the art and so the details will be omitted. When the received instruction is an unknown instruction ("Yes" in step S410), step S415 is executed.

In step S415, the processor 200 writes an emulation flag (EF) into a microarchitecture register 220. Specifically, when the received instruction is an unknown instruction, the instruction decoding unit 230 generates a microinstruction, and the unknown instruction identifier of the microinstruction is the first value. In one embodiment, the microinstruction is a no operation microinstruction (NOP). The instruction decoding unit 230 sends the microinstruction to the renaming unit 204. The renaming unit 204 renames the microinstruction. Then, the renaming unit 204 sends the microinstruction to the reordering buffer 240. The reordering buffer 240 stores the microinstruction in its own instruction entries. When the microinstruction is retired, the instruction retiring unit 245 generates an unknown instruction exception since the unknown instruction identifier of the microinstruction is the first value. In response to the unknown instruction exception, the processor 200 executes a microcode handler of the unknown instruction exception. In the microcode handler of the unknown instruction exceptions, the processor 200 writes an emulation flag into the microarchitecture register 220. In addition, the processor 200 also stores the information of the received instruction and the operating environment information of the received instruction in the microarchitecture register 220. Then, in the microcode handler of the unknown instruction exception, the processor 200 generates a system management interrupt (#SMI). In an embodiment, the information of the received instruction comprises an instruction pointer of the received instruction. In another embodiment, the information of the received instruction comprises the instruction pointer of the received instruction and the machine code of the received instruction. The operating environment information comprises the operating modes of the received instruction (that is, the operating modes of the processor 200 when the processor 200 executes the received instruction). For example, the operating modes comprise a real mode, a protected mode, a v8086 mode, a compatibility mode, and a long mode, and so on. Then, the processor 200 executes step S420.

In step S420, the processor 200 enters a system management mode. Specifically, in response to the system management interrupt, the processor 200 enters the system management mode by executing the system management mode entry 1142 shown in FIG. 1. As for the details of the processor 200 entering the system management mode, it will be described in detail later with reference to FIG. 5. Then, the processor 200 executes step S425.

In step S425, the processor 200 processes the received instruction. As for how the processor 200 processes the received instruction, the following will describe in detail with reference to FIGS. 6-8. Then, the processor 200 executes step S430.

In step S430, the processor 200 exits the system management mode, and the flow ends. Specifically, the processor 200 exits the system management mode by executing the system management mode exit 1144 shown in FIG. 1. As for how the processor 200 exits the system management mode, the following will describe in detail with reference to FIGS. 9A-9B.

Figure 5:
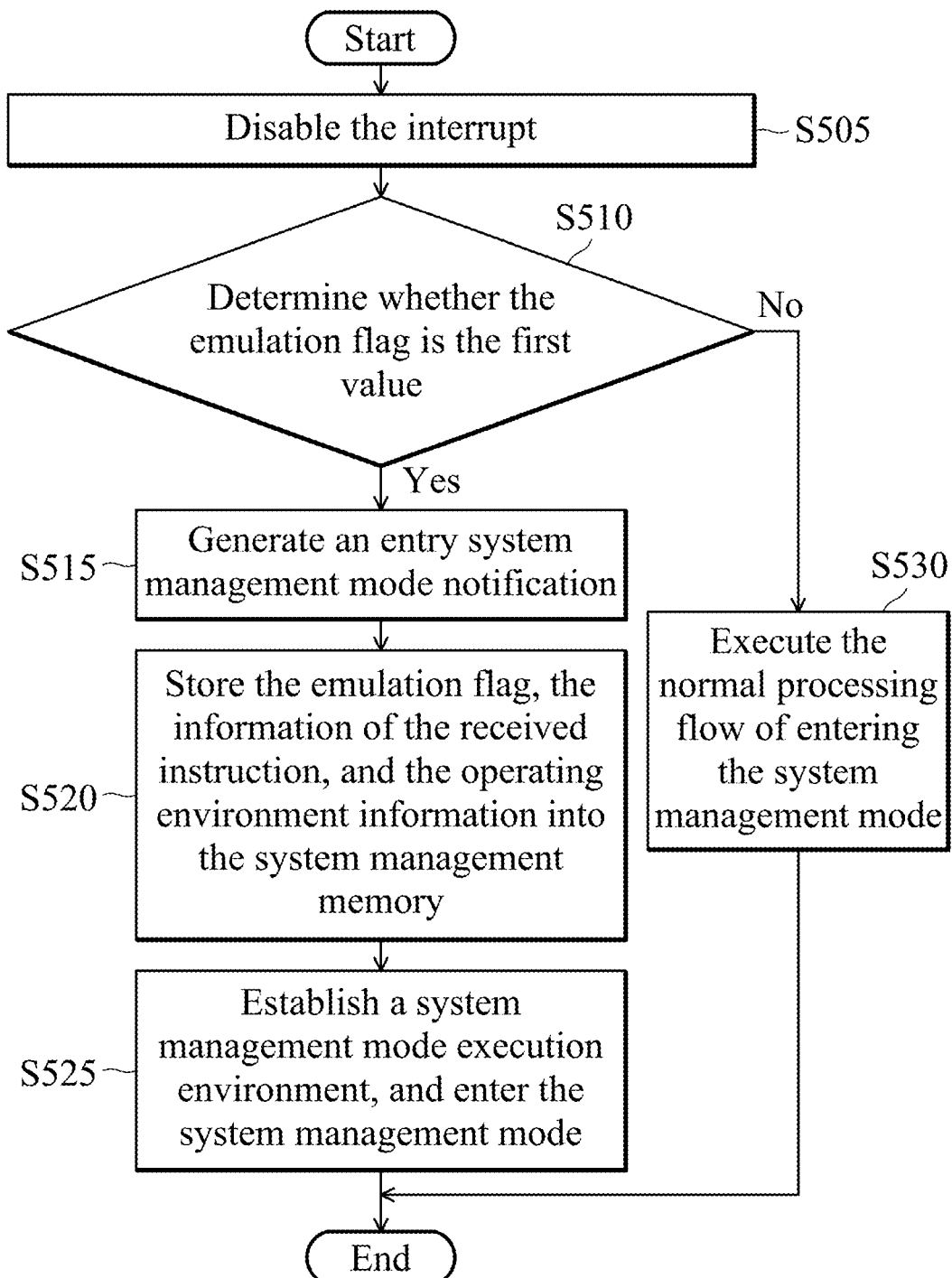
FIG. 5 shows a flowchart of entering the system management mode according to the first embodiment of the present disclosure.

FIG. 5 shows a flowchart of entering the system management mode according to the first embodiment of the present disclosure. FIG. 5 is a processing flow of the microcode handler corresponding to the system management mode entry 1142 shown in FIG. 1. Please refer to FIG. 2 and FIG. 5. As shown in FIG. 5, the processor 200 disables the interrupt (S505), and determines whether the emulation flag is the first value (S510). When the determination result of step S510 is "Yes", the processor 200 enters the system management mode. The detailed description is as follows: the processor 200 first executes step S505.

In step S505, the processor 200 disables interrupts. Those skilled in the art know that interrupts are disabled in the system management mode. Therefore, the present disclosure also continues this architectural requirement to disable interrupts. As for how to disable interrupts, for example, the processor 200 clears the IF flag to disable maskable interrupts, clears the TF flag to disable single-step interrupts, and clears DR7 to disable breakpoint interrupts. Then, the processor 200 executes step S510.

Next, in step S510, the processor 200 determines whether the emulation flag is the first value. Specifically, the processor 200 determines whether the emulation flag stored in the microarchitecture register 220 is the first value. When the determination result is "No", step S530 is executed to execute the normal processing flow of entering the system management mode. Those skilled in the art know the normal processing flow of the system management mode, so the details related to the normal processing flow will be omitted. When the determination result is "Yes", the processor 200 executes step S515.

In step S515, the processor 200 generates an entering system management mode notification (Assert #smmact) to notify the chipset that the processor 200 has entered the system management mode. As for how to generate the notification of entering the system management mode, it is the common knowledge of those skilled in the art, so the details will be omitted. Then, the processor 200 executes step S520.

In step S520, the processor 200 stores the emulation flag, the information of the received instruction, and the operating environment information into the system management memory. Specifically, the processor 200 reads the emulation flag, the information of the received instruction, and the operating environment information from the microarchitecture register 220, and stores the read emulation flag, the information of the received instruction, and the operating environment information in the system management memory. At the same time, the content in the architecture register 260 (that is, the current state of the processor 200) may also be stored in the system management memory. The information stored in the system management memory is shown in TABLE 1 below.

TABLE 1

| Architectural register | Emulation flag | Information of the received instruction | Operating environment information | |
|---|---|---|---|---|
| ... | ... | ... | ... | ... |

Then, the processor 200 executes step S525. The processor 200 establishes a system management mode execution environment, and enters the system management mode. How to establish the execution environment of the system management mode and how to enter the system management mode is the common knowledge of those skilled in the art, so the details will be omitted.

It should be noted that, in the actual operation of entering the system management mode through the system management mode entry 1142 in FIG. 1 shown in FIG. 5, after the system management interrupt (#SMI) is generated, those skilled in the art may add some microcodes used to execute and save the emulation flag, the information of the received instructions and the operating environment information to the system management memory (SMRAM) in the microcodes corresponding to entering the system management mode, and ensure that these data/information may not be overwritten when the processor 200 switches to the system management mode. Furthermore, due to the prior art, the processor 200 in the system management mode may access the system management memory (SMRAM), so those skilled in the art may make modifications based on this part of the microcodes to achieve the purpose of the processor to access the data/information. Since these microcodes may vary depending on the processor version, those skilled in the art may write corresponding microcodes according to actual conditions.

Then, the processor 200 processes the received instruction in the system management mode (as shown in step S425 in FIG. 4). The following describes how the processor 200 processes the received instructions in the system management mode with reference to FIGS. 6-8.

Figure 6:
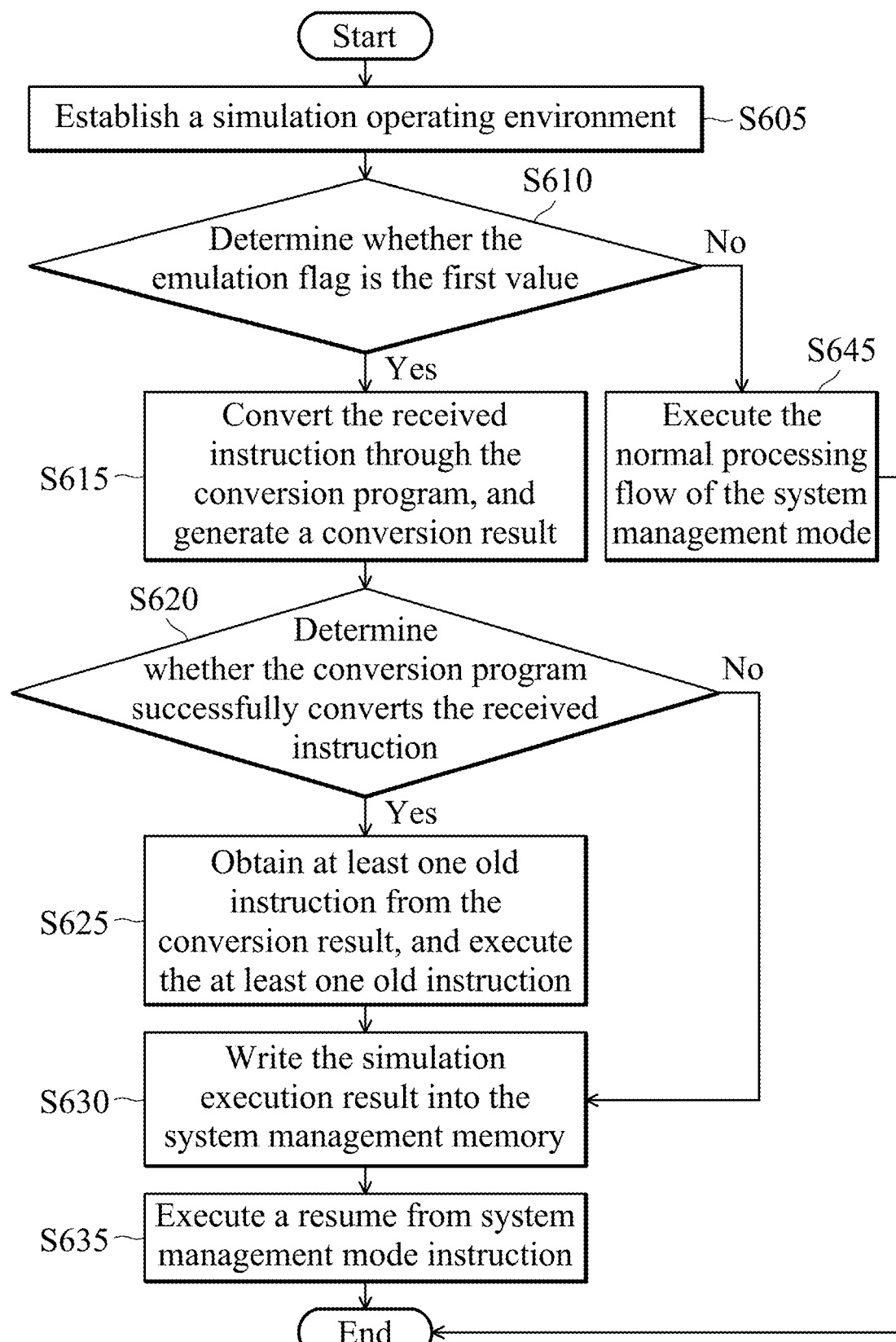
FIG. 6 is a flowchart showing the processing of the simulator according to the first embodiment of the present disclosure.

FIG. 6 is a flowchart showing the processing of the simulator according to the first embodiment of the present disclosure. As mentioned above, the processor 200 uses the simulator 142 to process the received instruction in the system management mode. Please refer to FIGS. 2 and 6. As shown in FIG. 6, in the system management mode, the simulator 142 establishes a simulation operating environment (S605), and then determines whether the emulation flag is the first value (S610). When the determination result of step S610 is "Yes", the simulator 142 converts the received instruction through the conversion program, and generates a conversion result (S615). Then, the simulator 142 processes the conversion result. The detailed description is as follows. First, the simulator 142 executes step S605.

In step S605, the simulator 142 establishes a simulation operating environment. Specifically, the simulator 142 reads the emulation flag, the information of the received instruction, the operating environment information of the received instruction, and the information of the architecture register from the system management memory. In the subsequent steps, the simulator 142 may use the read information to simulate the execution of the received instructions. Then, the simulator 142 executes step S610.

In step S610, the simulator 142 determines whether the emulation flag is the first value. Specifically, the simulator 142 determines whether the emulation flag read in step S605 is the first value. When the determination result is "No", the simulator 142 executes step S645. In step S645, the simulator 142 executes the normal processing flow of the system management mode. The normal processing flow of the system management mode is the common knowledge of those skilled in the art, so the details related to the normal processing flow will be omitted. When the determination result of step S610 is "Yes", the simulator 142 executes step S615.

In step S615, the simulator 142 converts the received instruction through the conversion program 145, and generates a conversion result. The structure of the conversion result is shown in TABLE 2 below, wherein the conversion result comprises two fields: a result field and a content field. When the result field is the first value, it means that the conversion is successful, and the content field comprises at least one old instruction converted from the received instruction and the length of the received instruction. When the result field is the second value, it means that the conversion failed, and the content field comprises an exception code. As for how to use the conversion program 145 to convert the received instruction, it will be described in detail later with reference to FIG. 7.

TABLE 2

| Result | Content |
|--------|---------|
| . . .  | . . .   |

In step S620, the simulator 142 determines whether the conversion program successfully converts the received instruction. Specifically, the simulator 142 determines whether the conversion program successfully converts the received instruction according to the result field in the conversion result. When the result field of the conversion result is the first value, the determination result is "Yes" and the simulator 142 executes step S625. When the result field of the conversion result is the second value, the determination result is "No", the simulator 142 generates a simulation execution result according to the conversion result, and then executes step S630. The structure of the simulation execution result is shown in TABLE 3 below, which comprises two fields: a result field and a detail field. When the result field of the simulation execution result is the first value, it means that the simulation execution is successful, and the operation result obtained after the simulation execution is stored in the detail field. When the result field of the simulation execution result is the second value, it means that the simulation execution failed and the exception code is stored in the detail field. When the result field of the conversion result is the second value, the simulation execution result generated according to the conversion result is shown in TABLE 3-1 below. The exception code in the detail field in TABLE 3-1 is the exception code in the content field of the conversion result.

TABLE 3

| Result | Detail |
|--------|--------|
| . . .  | . . .  |

TABLE 3-1

| Result | Detail |
|--------|--------|
| Second value | Exception code |

Furthermore, when the determination result of step S620 is that the conversion program successfully converts the received instruction (that is, the determination result of step S620 is "Yes"), the simulator 142 executes step S625. In step S625, the simulator 142 obtains at least one old instruction from the conversion result, and executes the at least one old instruction. Specifically, the simulator 142 obtains the at least one old instruction and the length of the received instruction from the content field of the conversion result. Then, the simulator 142 instructs the processor 200 to execute the at least one old instruction through a call instruction or a jump instruction. The processor 200 decodes the at least one old instruction into at least one microinstruction, executes the at least one microinstruction, and generates a simulation execution result. When a runtime exception occurs during the execution of the at least one microinstruction by the processor 200, the content field of the simulation execution result is shown in the following TABLE 3-2. The result field of the simulation execution result in TABLE 3-2 is the second value, indicating that the simulation execution failed. The detail field of the simulation execution result is the exception code, indicating that the number of the runtime exception. When the processor 200 successfully executes the at least one microinstruction, the content field of the simulation execution result is shown in the following TABLE 3-3. The result of the simulation execution result in TABLE 3-3 is the first value, which means that the simulation execution is successful, and the detail field of the simulation execution result is the calculation result.

TABLE 3-2

| Result | Detail |
|--------|--------|
| Second value | Exception code |

TABLE 3-3

| Result | Detail |
|--------|--------|
| First value | Calculation result |

In one embodiment, when the operand of the received instruction comprises a new architecture register, the new architecture register is simulated by the system management memory. For example, when a subsequent-generation processor of the processor 200 comprises a new architecture register with a bit width of 1024-bit, the simulator 142 may use a continuous 1024-bit storage space in the system management memory to simulate the new architecture register. That is, when the received instruction accesses the new architecture register, what the simulator 142 actually accesses is the continuous 1024-bit storage space in the system management memory.

When the new architecture register is the destination operand of the received instruction, the processor 200 stores the operation result of the received instruction in the system management memory after executing the at least one old instruction. In this way, when the processor 200 executes another received instruction which is also a new instruction and the new architecture register is the source operand of the another received instruction, the processor 200 directly use the operation result stored in the system management memory in the process of simulating the execution of the another received instruction. It should be noted that the received instruction and the another received instruction may be continuous (that is, adjacent), or not continuous, and it should not be limited in the disclosure.

In the system management mode, the simulator 142 can only access the system management memory, but cannot access the memory (that is, the system memory, the same below) in a normal way of accessing the memory. In an embodiment of the present disclosure, a physical memory direct access interface is provided to implement the operation of accessing the memory in the system management mode. When the received instruction comprises a memory operand, the memory operand can be accessed through the physical memory direct access interface. The steps to access the memory operand through the physical memory direct access interface are as follows.

In the first step, the simulator 142 converts the virtual address of the memory operand into a physical address. Specifically, the simulator 142 converts the virtual address of the memory operand into a physical address through the physical memory direct access interface by accessing a page table. The steps of converting a virtual address to a physical address are: 1. reading the base address of the page table stored in the architecture register CR3 from the system management memory; 2. simulating page table query process based on the base address of the page table and the virtual address to obtain the physical address.

In the second step, the simulator 142 reads the value of the memory operand according to the physical address through the physical memory direct access interface, wherein the physical address is not in the system management memory. Specifically, the simulator 142, through the physical memory direct access interface, uses a model specific register (MSR) to read the value of the memory operand according to the physical address. The specific steps are as follows.

In step 1, the simulator 142 writes the address of the model specific register into a first register (ECX), and writes the physical address into a second register (EDX:EAX).

In step 2, the simulator 142 executes a write MSR (WRMSR) instruction to store the value of the memory operand in the model specific register. Specifically, after the simulator 142 executes the WRMSR instruction, the physical address is written into the model specific register. Then, the processor 200 uses the physical address stored in the model specific register to load the value of the memory operand from the system memory to the model specific register by executing a load microinstruction from the physical address (ld_phys).

In step 3, the simulator 142 executes the read MSR (RDMSR) instruction to read the value of the memory operand from the model specific register, and stores the value of the memory operand in the second register.

In one embodiment, the next instruction of the received instruction is the another received instruction. The final instruction in the at least one old instruction is a jump instruction (jmp) or a call instruction (call). The processor 200 jumps to the another received instruction through the jump instruction or the call instruction. The instruction pointer of the another received instruction is: EIP+Length, wherein EIP is the instruction pointer of the received instruction, and Length is the length of the received instruction.

Then, the simulator 142 executes step S630. In step S630, the simulator 142 writes the simulation execution result into the system management memory. Specifically, the simulator 142 stores the simulation execution result generated in step S625 or step S620 into the system management memory. As shown above, there are two conditions in the simulation execution result: one is that the simulation execution is successful, and the other is that the simulation execution failed. The system management memory comprises an exception vector table, and the structure of the exception vector table is shown in TABLE 4 below. The exception vector table comprises two fields: an exception flag and an exception code. When the simulation execution result is stored in the system management memory, the simulator 142 needs to fill in the exception vector table in the system management memory. The following describes the process of the simulator 142 storing the simulation execution results of these two situations into the system management memory.

TABLE 4

| Exception flag | Exception code |
|---|---|
| ... | ... |

When the simulation execution is successful, the simulator 142 sets the exception flag field of the exception vector table in the system management memory to the first value (as shown in TABLE 4-1 below), and stores the calculation result stored in the detail field of the simulation execution result in the system management memory. For example, when the operation result shows that the value of the architecture register ECX is set to 10H (that is, the hexadecimal number 10, the same below), the simulator 142 needs to write 10H into the storage space corresponding to the architecture register ECX in the system management memory. When the operation result shows that the value of the new architecture register is set to 20H, the simulator 142 needs to write 20H into the storage space used to simulate the new architecture register in the system management memory. The simulator 142 also updates the instruction pointer stored in the system management memory to: EIP+Length, so that the instruction pointer points to the next instruction to be executed, wherein EIP is the instruction pointer of the received instruction, Length is the length of the received instruction. The storage space of the instruction pointer in the system management memory is the storage space corresponding to the architecture register EIP. When the processor exits the system management mode, the value in the storage space corresponding to the architecture register in the system management memory is written into the corresponding architecture register 260 to send the simulation execution result of the new instruction to the application 130 or the operating system 120. The details will be described later.

TABLE 4-1

| Exception flag | Exception code |
|---|---|
| First value | ... |

When the simulation execution fails, it means that an exception occurred during the simulation execution. The simulator 142 sets the exception flag field of the exception vector table in the system management memory to the second value (as shown in TABLE 4-2 below), and writes the exception code stored in the detail field of the simulation execution result into the exception code field of the exception vector table. It may be determined whether the exception is a trap according to the exception code. When the exception is a trap, the simulator 142 updates the instruction pointer stored in the system management memory to: EIP+ Length, so that the instruction pointer points to the next instruction set architecture instruction to be executed, wherein EIP is the instruction pointer of the received instruction, and Length is the length of the received instruction stored in the system management memory.

TABLE 4-2

| Exception flag | Exception code |
| --- | --- |
| Second value | Exception code |

Then, the simulator 142 executes step S635. In step S635, the simulator 142 executes a resume from system management mode (RSM) instruction. After executing the RSM instruction, the processor 200 executes the microcode handler of the system management mode exit 1144 as shown in FIG. 1, which will be described in detail below with reference with FIGS. 9A-9B.

Figure 7:
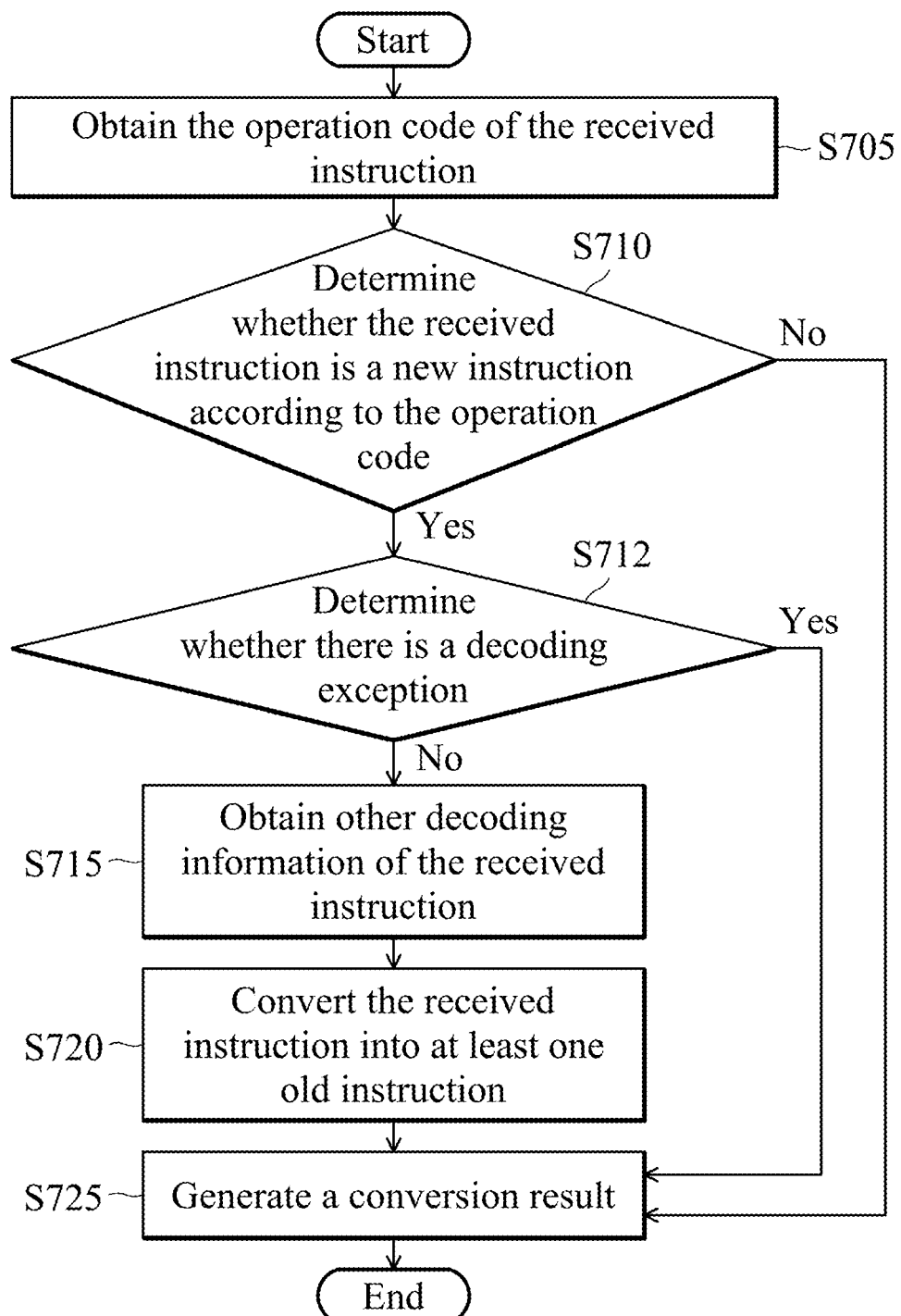
FIG. 7 shows a processing flowchart of the conversion program according to the first embodiment of the present disclosure.

FIG. 7 shows a processing flowchart of the conversion program according to the first embodiment of the present disclosure. FIG. 7 is a processing flowchart of the conversion program 145 shown in FIG. 1. Please refer to FIG. 2 and FIG. 7. As shown in FIG. 7, the conversion program 145 obtains the operation code of the received instruction (S705). Then, the conversion program 145 determines whether the received instruction is a new instruction according to the operation code (S710). When the received instruction is a new instruction, the conversion program 145 converts the received instruction into at least one old instruction (S720), and generates a conversion result (S725). The details are as follows: the conversion program 145 first executes step S705.

In step S705, the conversion program 145 obtains the operation code of the received instruction according to the information of the received instruction. It should be noted that since the received instruction has not been decoded at this time, the information of the received instruction does not comprise decoding information such as prefix, escape code, and operation code. According to the description of step S415 in FIG. 4, in one embodiment, the information of the received instruction only comprises the instruction pointer of the received instruction. In another embodiment, the information of the received instruction comprises the instruction pointer of the received instruction and the machine code of the received instruction. When the conversion program 145 executes the processing flow shown in FIG. 7, the processing flow can be divided into the following three cases.

The first case: the information of the received instruction only comprises the instruction pointer of the received instruction. When the conversion program 145 decodes the received instruction, the conversion program 145 reads and processes one-byte machine code at a time according to the instruction pointer of the received instruction until the decoding is completed.

The second case: the information of the received instruction only comprises the instruction pointer of the received instruction. The conversion program 145 first reads all bytes of the machine code of the received instruction according to the instruction pointer of the received instruction, and then decodes the machine code.

The third case: the information of the received instruction comprises the instruction pointer of the received instruction and the machine code of the received instruction. The conversion program 145 directly decodes the machine code in the information of the received instruction.

In the first case, the conversion program 145 executes the processing flow shown in FIG. 7. The conversion program 145 first executes step S705.

In step S705, the conversion program 145 obtains the operation code (opcode) of the received instruction. Specifically, the conversion program 145 obtains the operation code of the received instruction according to the information of the received instruction. As mentioned above (step S605 in FIG. 6), the information of the received instruction is read from the system management memory by the simulator 142. The information of the received instruction only comprises the instruction pointer of the received instruction, and the conversion program 145 obtains the operation code of the received instruction according to the instruction pointer of the received instruction. In detail, the conversion program 145 reads the first byte of the machine code of the received instruction from the memory according to the instruction pointer of the received instruction, and then determines the operation code of the received instruction according to the read byte (that is, the first byte). When the conversion program 145 cannot determine the operation code of the received instruction according to the first byte of the machine code, the conversion program 145 reads the second byte of the machine code, and then determines the operation code of the received instruction according to the read byte (i.e., the first 2 bytes). And so on, until the operation code of the received instruction is determined. It should be noted that when the received instruction comprises a prefix and/or an escape code, the conversion program 145 may first obtain the prefix and/or the escape code of the received instruction, and then obtain the operation code of the received instruction. In one embodiment, the conversion program 145 reads the machine code from the memory according to the instruction pointer of the received instruction through the physical memory direct access interface as described above. After the conversion program 145 obtains the operation code, the conversion program 145 executes step S710.

Next, in step S710, the conversion program 145 determines whether the received instruction is a new instruction. Specifically, the conversion program 145 determines whether the received instruction is a new instruction according to the operation code of the received instruction. For example, the operation code of the new instruction supported by the processor 200 may be stored in a lookup table. The conversion program 145 may check whether the operation code is stored in the lookup table. When the operation code is stored in the lookup table, it means that the received instruction is a new instruction, and the determination result is "Yes"; otherwise, the determination result is "No". In one embodiment, the lookup table is stored in the system management memory. In one embodiment, the conversion program 145 determines whether the received instruction is a new instruction according to the escape code and the operation code of the received instruction at the same time.

When the received instruction is not a new instruction (the determination result of step S710 is "No"), it means that the received instruction is an unrecognizable instruction, and the conversion program 145 executes step S725 to generate the conversion result shown in TABLE 2-1 below. As shown in the following TABLE 2-1, the value of the result field of the conversion result is the second value, which indicates that the conversion failed. The content field of the conversion result is the exception code #UD (the value is 6) of the unknown instruction exception.

TABLE 2-1

| Result | Content |
| --- | --- |
| Second value | #UD |

When the received instruction is a new instruction (the determination result of step S710 is "Yes"), the conversion program 145 executes step S712. In step S712, the conversion program 145 determines whether there is a decoding exception. Specifically, as described above (step S605 in FIG. 6), the simulation program 142 reads the operating environment information at the time when the processor 200 executes the received instruction from the system management memory, wherein the operating environment information comprises the operating mode of the processor 200. The conversion program 145 determines whether the received instruction can be executed in the operating environment. For example, when the operating mode is the real mode and the received instruction cannot run in the real mode, the determination result of step S712 is "Yes". When the received instruction can run in the real mode, the determination result of step S712 is "No".

In one embodiment, the operation code of the new instruction and the operating environment supporting the new instruction are stored in a lookup table. The conversion program 145 can find out under which operating environments the received instruction can run, through the lookup table, according to the operation code of the received instruction. In another embodiment, the lookup table is stored in the system management memory.

When the conversion program 145 determines that there is a decoding exception (the determination result of step S712 is "Yes"), the conversion program 145 executes step S725 to generate the conversion result shown in the following TABLE 2-2. As shown in the following TABLE 2-2, the value of the result field of the conversion result is the second value, which means the conversion failed. The content field of the conversion result is the exception code #UD (the value is 6) of the unknown instruction exception.

TABLE 2-2

| Result | Content |
| --- | --- |
| Second value | #UD |

When the conversion program 145 determines that there is no decoding exception (the determination result of step S712 is "No"), step S715 is executed. In step S715, the conversion program 145 obtains other decoding information of the received instruction. Specifically, the conversion program 145 continues to read the machine code of the received instruction from the memory byte by byte, decodes the machine code while reading the machine code until the conversion program 145 obtains other decoding information of the received instruction, and calculates the length of the received instruction, wherein the other decoding information comprises the operand mode (ModR/M), the source operand and the destination operand, and so on. Those skilled in the art know that only after the conversion program completes the decoding of the received instruction, the conversion program calculates the length of the received instruction. Then, the conversion program 145 executes step S720.

In step S720, the conversion program 145 converts the received instruction into at least one old instruction. Specifically, the conversion program 145 may convert the received instruction into at least one old instruction by using a lookup table. For example, at least one old instruction corresponding to the received instruction may be stored in a lookup table first. Then, the conversion program 145 obtains the at least one old instruction from the lookup table according to the operation code of the received instruction. In one embodiment, when the received instruction comprises an escape code, the conversion program 145 obtains the at least one old instruction from the lookup table according to the escape code and operation code of the received instruction. In another embodiment, the conversion program 145 obtains the at least one old instruction from the lookup table according to the escape code, the operation code, and the operand mode of the received instruction.

It should be noted that since the at least one old instruction obtained from the lookup table does not comprise the other decoding information such as the source operand and/or the destination operand of the received instruction, the other decoding information is needed to be written into the at least one old instruction, so that the at least one old instruction may be used to simulate the execution of the received instruction. For example, the conversion program 145 writes the specific values of the source operand and/or the destination operand of the received instruction into the corresponding location in the at least one old instruction. Then, the processor 200 can simulate the execution of the new instruction by executing the at least one old instruction. In one embodiment, the conversion program 145 writes the other decoding information into the at least one old instruction according to the prefix of the received instruction.

In one embodiment, the lookup table is stored in a basic input output system (BIOS). Those skilled in the art know that the system 100 for executing new instructions can execute the basic input output system when the system 100 for executing new instructions is started up. The basic input output system comprises codes for initializing the system management mode. When the system 100 executes the codes for initializing the system management mode, the lookup table is loaded into the system management memory. Then, the conversion program 145 can obtain the at least one old instruction from the lookup table according to the operation code of the received instruction.

In another embodiment, the conversion program 145 stores the at least one old instruction in a memory or a cache. When the processor 200 executes another instruction and the another received instruction is a new instruction, the conversion program 145 determines whether the received instruction and the another received instruction are the same instruction. When the received instruction and the other received instruction are the same instruction, the conversion program 145 directly obtains the at least one old instruction from the memory or the cache.

Then, the conversion program 145 executes step S725 to generate the conversion result shown in the following TABLE 2-3. As shown in TABLE 2-3, the value of the result field of the conversion result is the first value, which means the conversion program successfully converts the received instruction. The content field of the conversion result is the length of the received instruction and the at least one old instruction.

TABLE 2-3

| Result | Content |
| --- | --- |
| First value | The length of the received instruction and at least one old instruction |

The process by which the conversion program 145 executes the processing flow of FIG. 7 in the second case is described as follows. In the second case, the process of steps S710, S712, S720 and S725 executed by the conversion program 145 is the same as that in the first case, so the details related to steps S710, S712, S720 and S725 will be omitted. Steps S705 and S715 are described below.

In the second case, unlike the first case, in step S705, the conversion program 145 first reads the complete machine code of the received instruction from the memory according to the instruction pointer of the received instruction. Then, the conversion program 145 decodes the machine code to obtain the operation code of the received instruction. Next, in step S715, the conversion program 145 also decodes the machine code read in step S705 to obtain other decoding information of the received instruction. The other processing in the second case is the same as that in the first case, so the details will be omitted.

It should be noted that when the conversion program 145 reads the machine code according to the instruction pointer of the received instruction, since the conversion program 145 does not yet know the length of the received instruction, the conversion program 145 needs to read the machine code of sufficient length. For example, it is assumed that the length of the longest new instruction among the new instructions that can be processed by the processor 200 is 15 bytes. Then, the conversion program 145 needs to read the machine code whose length is at least 15 bytes.

The process by which the conversion program 145 executes the processing flow of FIG. 7 in the third case is described as follows. In the third case, the process of steps S710, S712, S720 and S725 executed by the conversion program 145 is the same as that in the second case, so the details related to steps S710, S712, S720 and S725 will be omitted. Steps S705 is described below.

In the third case, unlike the second case, in step S705, the conversion program 145 directly decodes the machine code in the information of the received instruction to obtain the operation code of the received instruction. The other processing in the third case is the same as that in the second case, so the details will be omitted.

Figure 8:
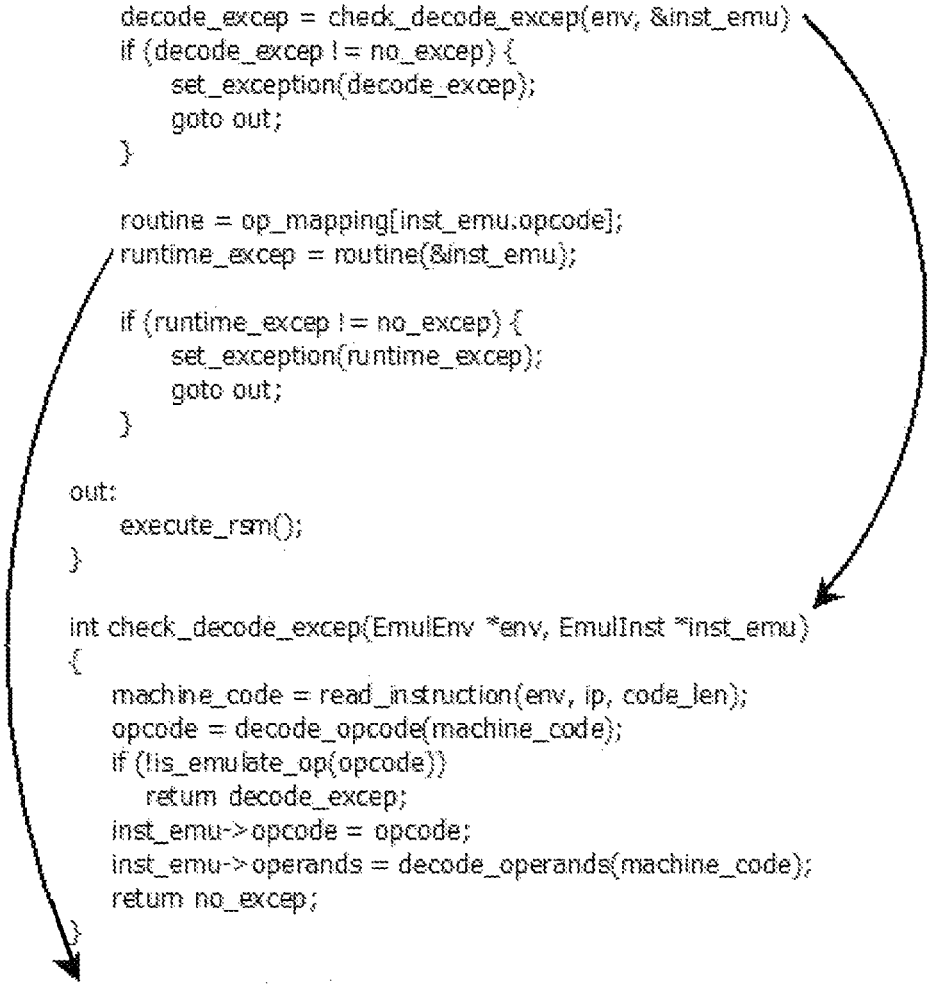
FIG. 8 shows an example of processing unknown instructions in the system management mode according to the first embodiment of the present disclosure.

FIG. 8 shows an example of processing unknown instructions in the system management mode according to the first embodiment of the present disclosure. FIG. 8 is a processing flow showing how to process unknown instructions as shown in FIGS. 6 and 7 in the form of pseudo code, which is an implementation of the simulator.

As shown in FIG. 8, lines 1-25 are the code included in the simulator's main function, simulator_start. Lines 27-36 are the code included in the decoding function, check_decode_excep. Lines 38-47 are the code included in the simulation function of the new instruction function, Unsupport_X_handle, wherein the code includes at least one old instruction corresponding to the received instruction described above. The main function, simulator_start, is described below first.

In the main function, simulator_start, the third line of code is executed first. The third line of code is used to complete the function of step S605 in FIG. 6, that is, the processor 200 establishes a simulation operating environment. In the third line of code, the processor 200 establishes a simulation operating environment through the function, setup_simulator_env. After executing the third line of code, the processor 200 stores the emulation flag, the information of the received instruction, the operating environment information of the received instruction, and the information of the architecture register read from the system management memory into the variable, env. For example, in the 4th line of code, the value of the emulation flag is accessed through env.emulation_flag. The 4th line of code completes the function of step S610 in FIG. 6, that is, the processor 200 determines whether the emulation flag is the first value. When the determination result of the 4th line of code is that the emulation flag is not the first value, the 5th line of code is executed. The 5th line of code executes the function of step S645 in FIG. 6, that is, the processor 200 executes the normal processing flow of the system management mode. In the 5th line of code, the processor 200 executes the normal processing flow of entering the system management mode through the function, exit_to_normal_SMM. When the determination result of the 4th line of code is that the emulation flag is the first value, the 8th line of code is executed to define the variable, inst_emu, as the outgoing parameter of the decoding function, check_decode_excep, in the 9th line of code (described later). Then, the 9th line of code is executed.

The code in lines 9-15 executes the function of step S615 in FIG. 6, that is, the processor 200 converts the received instruction through a conversion program and generates a decoding result. Specifically, the processor 200 first executes the 9th line of code, and obtains decoding information such as the operation code of the received instruction through the decoding function, check_decode_excep, wherein the decoding information is stored in the outgoing parameter, inst_emu. Then, the processor 200 executes the 10th line of code to determine whether the decoding is successful. In the 10th line of code, the processor 200 determines whether the decoding is successful according to the decoding result, decode_excep. When the decoding fails (it means that the conversion has failed), the processor 200 executes the 11th line of code. The 11th line of code executes the function of step S630 in FIG. 6, that is, the processor 200 writes the simulation execution result of the conversion failure into the system management memory. In the 11th line of code, the processor 200 writes the simulation execution result of the conversion failure into the system management memory through the function, set_exception. After the 11th line of code is executed, the 12th line of code is executed, and then the processor 200 jumps to the 23rd line of code. In the 12th line of code, the processor 200 jumps to the location of the label, out, (that is, the 23rd line) through the instruction, goto. Then, the processor 200 continues the execution from the 23rd line of code. Since there is only one label, out, in the 23rd line of code and there is no code to be executed, the processor 200 executes the 24th line of code. The 24th line of code executes the function of step S635 in FIG. 6, that is, the processor 200 executes the resume from system management mode instruction. In the 24th line of code, the processor 200 executes the resume from system management mode instruction through the function, execute_rsm. Then, the processor 200 executes the microcode of the system management mode exit 1144 as shown in FIG. 1. When the determination result of the 10th line of code is that the decoding is successful, the 15th line of code is executed. The 15th line of code executes the function of step S720 in FIG. 7, that is, the processor 200 converts the received instruction into at least one old instruction according to the information of the received instruction. As shown in FIG. 8, in the 15th line of code, the at least one old instruction is found from the table, op mapping, by using the operation code of the received instruction. The function pointer, routine, is used to represent the at least one old instruction, and the value of routine is the address of the function, Unsupport_X_handle. Then, the 16th line of code is executed.

The 16th line of code executes the function of step S625 in FIG. 6, that is, the processor 200 executes at least one old instruction. When the function, routine, is executed, the processor 200 actually executes the simulation function, Unsupport_X_handle, (which will be described in detail later). After the function, routine, is executed, a value, runtime_excep, is returned. Then, the 18th to 19th lines of code are executed. The 18th to 19th lines of code execute the function of step S630 in FIG. 6, that is, the processor 200 determines whether there is a runtime exception. When there is a runtime exception, the processor 200 writes the simulation execution result of the runtime exception into the system management memory. In the 18th line of code, the processor 200 determines whether there is a runtime exception according to the value of the return value, runtime_excep. When there is a runtime exception, the 19th line of code is executed. In the 19th line of code, the processor 200 stores the simulation execution result of the runtime exception into the system management memory through the function, set_exception. Then, the processor 200 executes the 20th line of code and jumps to the 23rd line of code through the instruction, goto. As mentioned above, the processor 200 may execute the 24th line of code next. The function of the 24th line of code has been described before, so the details related to the function of the 24th line of code will be omitted.

The decoding function, check_decode_excep, is described below.

In the decoding function, check_decode_excep, the 29th to 30th lines of code are first executed to obtain the operation code of the received instruction (step S705 in FIG. 7). In 29th line of code, the processor 200 reads the machine code, machine_code, of the received instruction through the function, read_instruction. Here, the processor reads the machine code, machine_code, with the byte length, code_len, from the memory according to the instruction pointer, ip, of the received instruction (that is, the second case mentioned in the previous explanation of FIG. 7), and the value of code_len can be 15. In 30th line of code, the processor 200 decodes the machine code, machine_code, through the function, decode_opcode, to obtain the operation code, opcode, of the received instruction. In the 31st line of code, the processor 200 determines whether the received instruction is a new instruction according to the opcode through the function, is_emulate_op, (step S710 in FIG. 7). When the received instruction is not a new instruction, the processor 200 executes the code on the 32nd line of code, and returns decoding exception information to the main function, simulator_start, through the instruction, return. When the received instruction is a new instruction, the processor 200 first executes the 33rd line of code, and stores the opcode in the outgoing parameter, inst_emu, executes the 34th line of code to obtain other decoding information of the received instruction (Step S715 in FIG. 7), and store the other decoding information in the outgoing parameter, inst_emu. Finally, the processor 200 executes the 35th line of code to return the decoding success information to the main function, simulator_start, through the instruction, return. The main function, simulator_start, can obtain the opcode and the other decoding information, operands, of the received instruction through the outgoing parameter, inst_emu.

The simulation function, Unsupport_X_handle, is described below.

In the simulation function, Unsupport_X_handle, the 40th to 41st lines of code are first executed. The 40th to 41st lines of code execute the operation of reading the value of the operand and storing the value of the read operand in the array, op. In the 41st line of code, the processor completes the operation of reading operands through the function, read_op. Specifically, the function, read_op, obtains the value of the operand from the variable, env, described above. The 42nd line of code executes step S625 in FIG. 6, that is, the processor 200 executes the at least one old instruction. In other words, the processor 200 simulates the execution of the received instruction. In the 42nd line of code, op represents the operand of the received instruction, and 'operate with op' represents that the value of the operand of the received instruction is written into the at least one old instruction, and the at least one old instruction is executed. Then, the 43rd line of code is executed. The 43rd line of code executes step S630 in FIG. 6, that is, the processor 200 writes the simulation execution result (comprising simulation execution results that generate runtime exceptions and simulation execution results that do not generate runtime exceptions) into the system management memory. Specifically, in the 43rd line of code, the processor 200 stores the simulation execution result into the system management memory through the function, write_result_to_SMRAM. The 44rd line of code determines whether a runtime exception occurs when the 42nd line of code is executed. When a runtime exception occurs, the 45th line of code is executed, and the exception information is sent to the main function; otherwise, the 46th line of code is executed, and the correct execution information is sent to the main function. In the 45th and 46th lines of code, the processor 200 sends the exception information or the correct execution information to the main function, simulator_start, through the instruction, return.

Figure 9A:
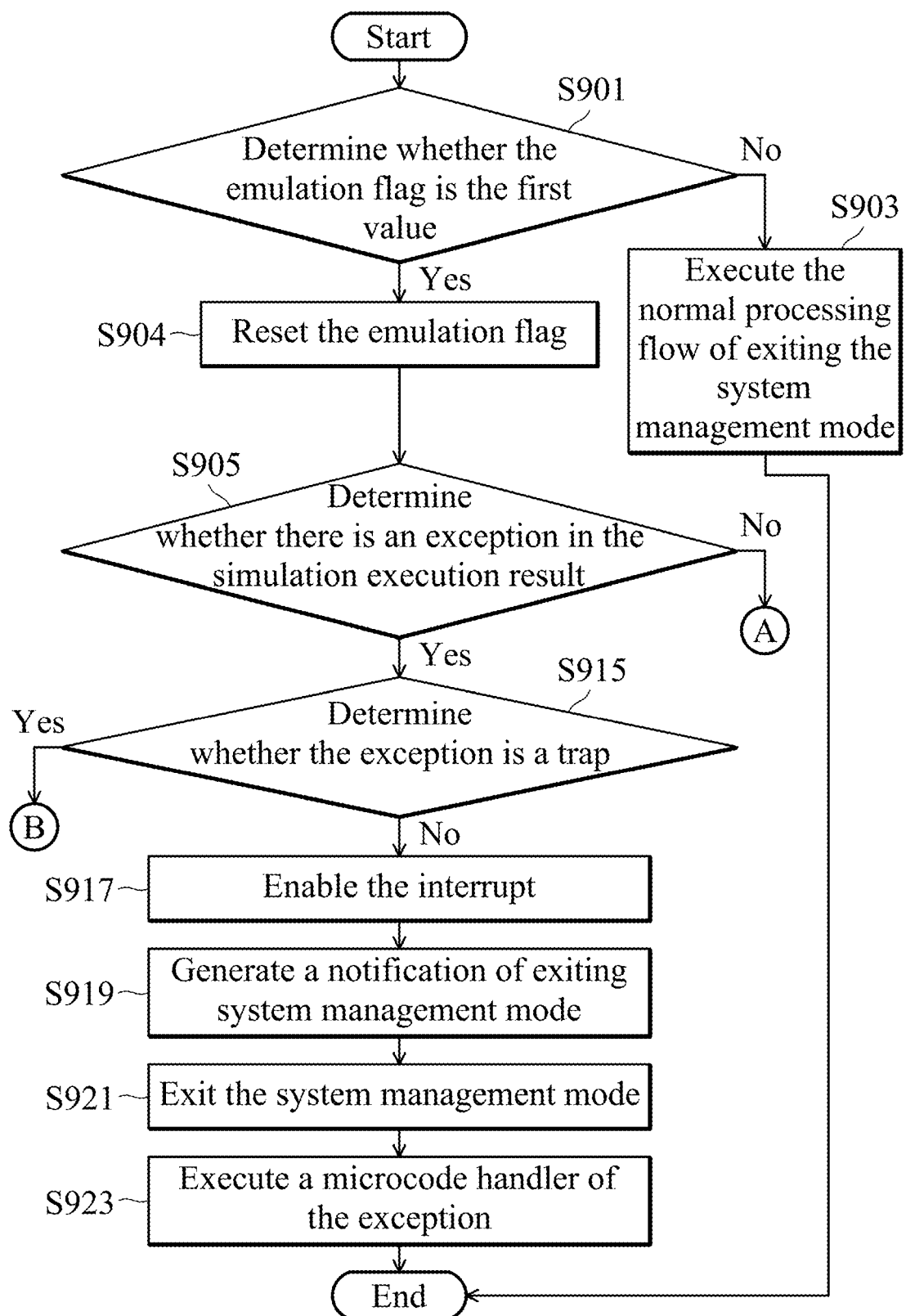
FIGS. 9A-9B show a flowchart of exiting the system management mode according to the first embodiment of the present disclosure.
Figure 9B:
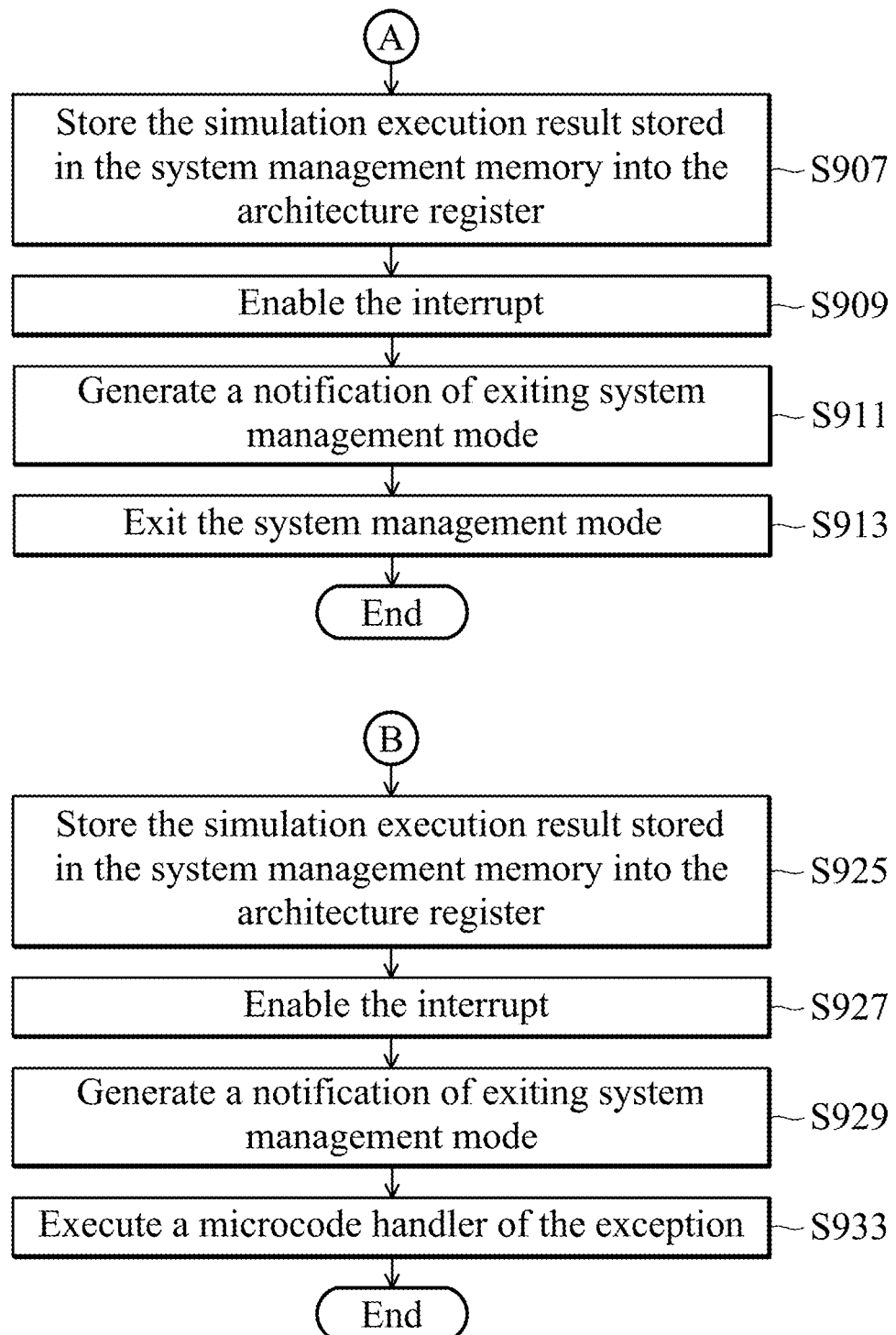

FIGS. 9A-9B show a flowchart of exiting the system management mode according to the first embodiment of the present disclosure. FIGS. 9A to 9B are the processing flow of the microcode handler corresponding to the system management mode exit 1144 shown in FIG. 1. Please refer to FIGS. 2, 9A and 9B. As shown in FIGS. 9A to 9B, when exiting the system management mode, the processor 200 determines whether the emulation flag is the first value (S901). When the determination result is "Yes", the processor 200 resets the emulation flag (S904), and determines whether there is an exception in the simulation execution result (S905). The processor 200 executes the operation of exiting the system management mode according to whether there is an exception in the simulation execution result and the type of the exception. The detailed description is as follows: the processor 200 first executes step S901.

In step S901, the processor 200 determines whether the emulation flag is the first value. Specifically, the processor 200 reads the emulation flag from the system management memory (As shown in the description of step S520 in FIG. 5 above, the emulation flag is stored in the system management memory), and then determines whether the emulation flag is the first value. When the emulation flag is not the first value, the processor 200 executes step S903. In step S903, the processor 200 executes the normal processing flow of exiting the system management mode. The normal processing flow of exiting the system management mode is the common knowledge of those skilled in the art, so the details will be omitted. When the emulation flag is the first value, the processor 200 executes step S904.

In step S904, the processor 200 resets the emulation flag. Specifically, the processor 200 sets the emulation flag in the microarchitecture register 220 and emulation flag in the system management memory to the second value. After resetting the emulation flag, the processor 200 executes the normal processing flow of the system management mode in the subsequent execution process when a normal system management interrupt occurs. Then, the processor 200 executes step S905.

In step S905, the processor 200 determines whether there is an exception in the simulation execution result. Specifically, the processor 200 reads the exception vector table shown in TABLE 4 from the system management memory. When the value of the field of the exception flag in the exception vector table is the first value, it means that the exception exists in the simulation execution result, and the determination result is "Yes". When the value of the field of the exception flag in the exception vector table is the second value, it means that there is no exception in the simulation execution result, and the determination result is "No". When the determination result is "No", the processor 200 executes step S907.

As shown in FIG. 9B, in step S907, the processor 200 stores the simulation execution result stored in the system management memory into the architecture register. As described above, in step S630 in FIG. 6, the processor 200 has written the simulation execution result of the received instruction into a region corresponding to the architectural register in the system management memory. In this step, the processor 200 stores the values in the region corresponding to the architectural register in the system management memory into the architectural register 260. In this way, this is equivalent to the processor 200 has executed the received instruction.

When the destination operand of the received instruction is a new architecture register, the processor 200 cannot store the values stored in the region of the system management memory for simulating the new architecture register since the architecture register 260 of the processor 200 does not comprise the new architecture register. As mentioned above, when the processor 200 simulates another new instruction and the operand of the another new instruction is also the new architecture register, the processor 200 directly use the values stored in the region of the system management memory for simulating the new architecture register to simulate the execution of the another new instruction.

Then, the processor 200 executes step S909. In step S909, the processor 200 enables the interrupt. For example, the processor 200 sets the IF flag to enable maskable interrupts, sets the TF flag to enable single-step interrupts, and sets DR7 to enable breakpoint interrupts. Then, the processor 200 executes step S911.

In step S911, the processor 200 generates a notification of exiting system management mode (Deassert #smmact) to notify the chipset that the processor 200 has exited the system management mode. Then, the processor 200 executes step S913 to exit the system management mode.

As shown in FIG. 9A, when the processor 200 determines that there is an exception in the simulation execution result in step S905, step S915 is executed.

In step S915, the processor 200 determines whether the exception is a trap. Specifically, the processor 200 determines whether the exception in the simulation execution result is a trap according to the exception flag and the exception code in the exception vector table read from the system management memory in step S905. For example, when the exception flag is the first value and the exception code is 3 (the content in TABLE 4 is shown in TABLE 4-3 below), it indicates an overflow exception. The type of overflow exception is a trap, so the determination result is "yes". When the exception flag is the first value and the exception code is 0 (the content in TABLE 4 is shown in TABLE 4-4 below), it indicates a division error exception. The division error exception is a fault, not a trap, so the determination result is "No".

TABLE 4-3

| Exception flag | Exception code |
|---|---|
| First value | 3 |

TABLE 4-4

| Exception flag | Exception code |
|---|---|
| First value | 0 |

When the determination result of step S915 is "No", the processor 200 executes steps S917, S919, S921, and S923, wherein step S917, step S919 and step S921 are the same as step S909, step S911 and step S913 respectively, so the details related to step S917, step S919 and step S921 will be omitted. Step S923 is described below.

In step S923, the processor 200 executes a microcode handler of the exception. Specifically, the processor 200 determines whether an exception has occurred according to the exception flag in the exception vector table stored in the system management memory. When an exception occurs, the processor 110 executes the microcode handler of the exception according to the exception code stored in the exception vector table. That is, the microcode handler of the exception corresponding to the exception code is executed. For example, when the exception flag in the exception vector table stored in the system management memory is the first value, it indicates that the exception exists in the simulation execution result. When the exception code in the exception vector table is 0, it means that the exception is a division error, and the processor 200 may execute a microcode handler of the division error.

In step S915, when the determination result is "Yes", that is, when the exception of the simulation execution result is a trap, the processor 200 executes steps S925, S927, S929, and S933 shown in FIG. 9B, wherein steps S925, S927, and S929 are the same as steps S907, S909, and S911, respectively, so the details related to step S925, S927, and S929 will be omitted. Step S933 is described below.

In step S933, the processor 200 executes a microcode handler of the exception. For example, when there is an exception in the simulation execution result and the exception is an overflow exception, the processor 200 executes a microcode processing handler for the overflow exception. In the actual operation of exiting the system management mode through the system management interrupt exit 1144 shown in FIGS. 9A and 9B, after the resume from system management mode (RSM) instruction is called, those skilled in the art may add some microcodes, for storing the simulation execution result from the system management memory into the architecture register, to the microcodes corresponding to the resume from system management mode, so as to transmit the simulation execution result to the application program 130 or the operating system 120. Since these microcodes are different depending on the processor version, those skilled in the art may write corresponding microcodes according to actual conditions.

It should be noted that, in the first embodiment, the microarchitecture register 220 is a register that already exists in the processor 200. Therefore, in the first embodiment of the present disclosure, the new instructions may be executed on the previous-generation processor without modifying the hardware structure of the processor. Therefore, by upgrading the microcodes in the first embodiment of the present disclosure, the processor that has been produced can obtain the function of executing the new instruction.

Second Embodiment

Figure 10:
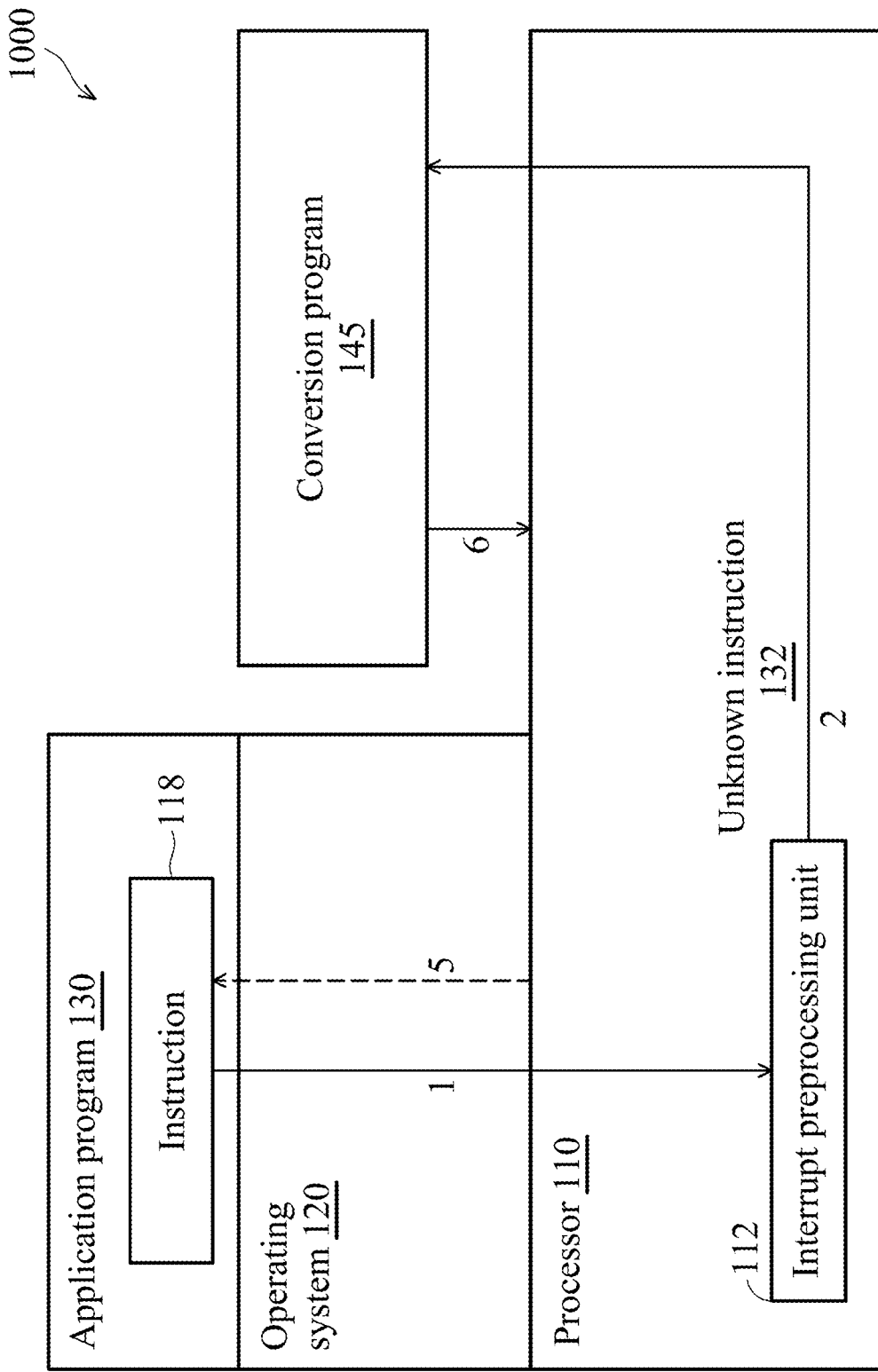
FIG. 10 is a schematic diagram of a system for executing new instructions according to the second embodiment of the present disclosure.

FIG. 10 is a schematic diagram of a system 1000 for executing new instructions according to the second embodiment of the present disclosure. The difference from the first embodiment shown in FIG. 1 is that the conversion program 145 in the system 1000 for executing new instructions shown in FIG. 10 runs directly on the processor 110 in the same execution mode as the new instructions. In addition, since the conversion program 145 in the second embodiment runs in the same execution mode as the new instructions, the processor does not need to switch the operation mode when executing the conversion program 145. The difference between the second embodiment and the first embodiment are described in detail below.

As shown in FIG. 10, when the instruction 118 is an unknown instruction 132, the processor 110 executes a microcode handler for handling the unknown instruction exception. In the microcode handler for handling the unknown instruction exception, the conversion program 145 is directly called (as shown by the solid arrow 2 in FIG. 10). The conversion program 145 determines whether the unknown instruction 132 is a new instruction. When the unknown instruction 132 is a new instruction, the conversion program 145 converts the new instruction into at least one old instruction, and sends the at least one old instruction to the microcode handler that handles the unknown instruction exception (as shown by the solid arrow 6 in FIG. 10). The microcode handler that handles the unknown instruction exception receives the at least one old instruction, and instructs the processor 110 to execute the at least one old instruction through a call instruction (call) or a jump instruction (jmp).

Figure 11:
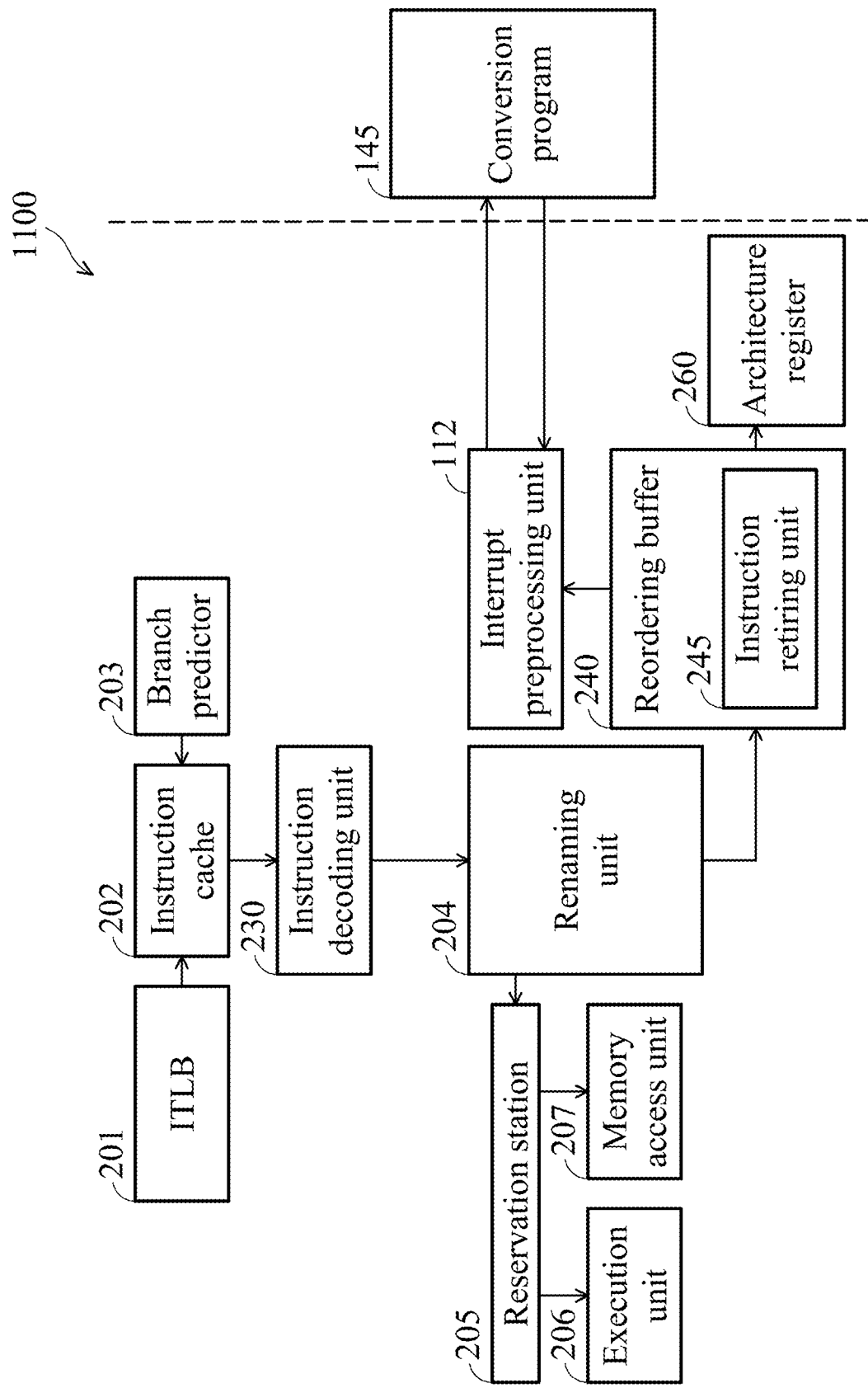
FIG. 11 is a structural diagram of the processor according to the second embodiment of the present disclosure.

FIG. 11 is a structural diagram of the processor according to the second embodiment of the present disclosure. The functions of the components with the same names in FIG. 11 and FIG. 2 are the same, so the details related to the functions of the components will be omitted.

It should be noted that, as shown in FIG. 11, the processor 1100 on the left of the dashed line is a structural diagram of the processor 110 shown in FIG. 10. The conversion program 145 on the right of the dashed line runs on the processor 1100 in the same execution mode as the new instruction (that is, the processor does not need to switch the execution mode). The conversion program 145 may be stored in the interrupt preprocessing unit 112 in the processing core of the processor 1100. In another embodiment, the conversion program 145 may be stored in an uncore of the processor 1100. Therefore, all the processing cores of the processor 1100 can share the conversion program 145.

Figure 12:
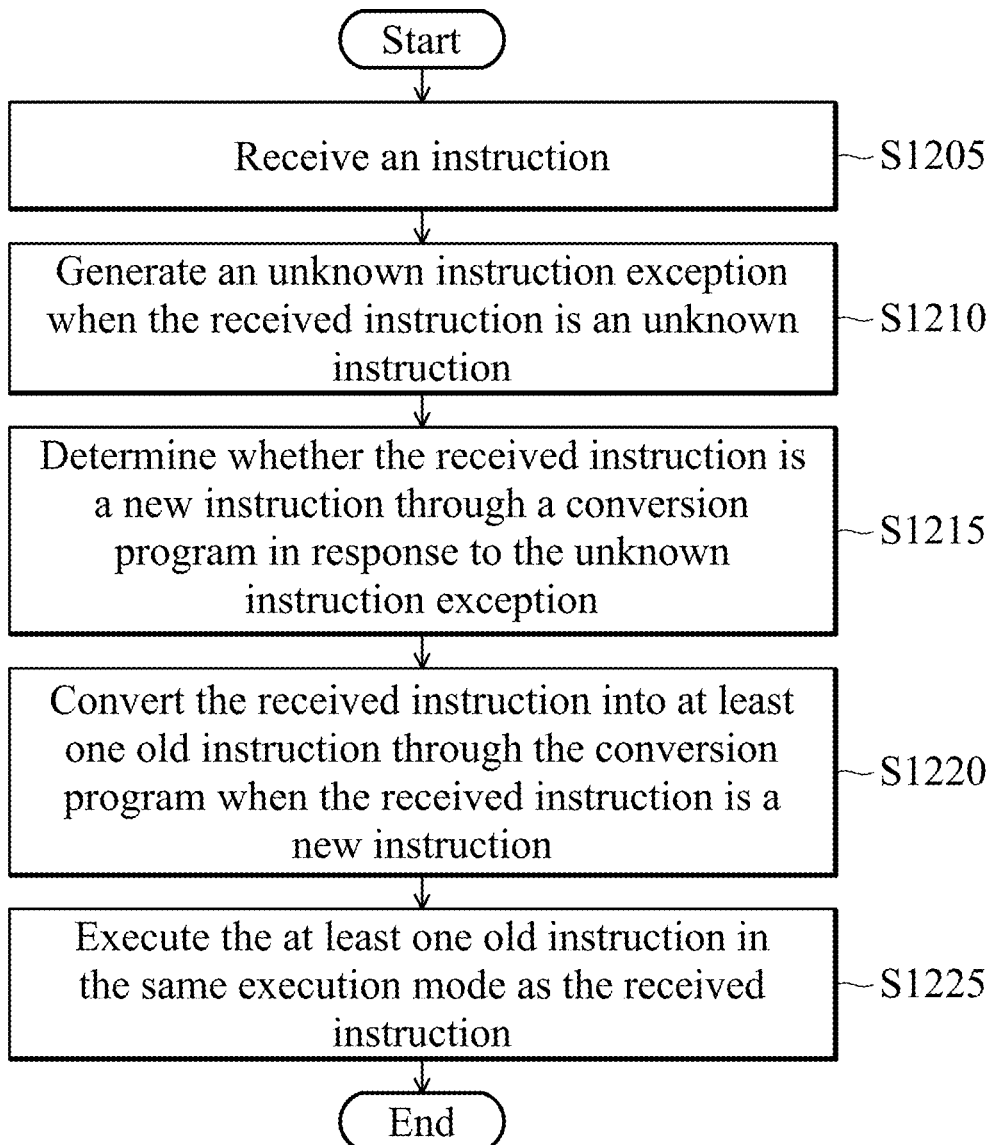
FIG. 12 is a flowchart showing the execution of the new instruction according to the second embodiment of the present disclosure.

FIG. 12 is a flowchart showing the execution of the new instruction according to the second embodiment of the present disclosure. The processing flow shown in FIG. 12 can be executed by the processor 1100 in FIG. 11. As shown in FIG. 12, the processor 1100 receives an instruction (S1205), and when the received instruction is an unknown instruction, the processor 1100 generates an unknown instruction exception (S1210). In response to the unknown instruction exception, the processor 1100 determines whether the received instruction is a new instruction through a conversion program (S1215). When the received instruction is a new instruction, the processor 1100 converts the received instruction into at least one old instruction through the conversion program (S1220). Finally, the processor 1100 executes the at least one old instruction in the same execution mode as the received instruction (S1225). Steps S1205 and S1210 in FIG. 12 are the same as steps S305 and S310 in FIG. 3, so the details related to steps S1205 and S1210 will be omitted. The difference between steps S320 and S325 in FIG. 3 and steps S1220 and S1225 in FIG. 12 is that steps S320 and S325 in FIG. 3 run in the system management mode, while steps S1220 and S1225 in FIG. 12 run in the same execution mode as the received instruction. The functions performed by steps S320 and S325 in FIG. 3 are the same as those performed by steps S1220 and S1225 in FIG. 12, so the details related to steps S1220 and S1225 will be omitted. Only step S1215 is described below.

In step S1215, in response to the unknown instruction exception, the processor 1100 determines whether the received instruction is a new instruction through a conversion program. Specifically, after the instruction retiring unit 245 generates an unknown instruction exception, the processor 1100 executes a microcode handler for handling the unknown instruction exception. In the microcode handler for handling unknown instruction exceptions, the processor 1100 sends the information of the received instruction and operating environment information to the conversion program 145. The conversion program 145 determines whether the received instruction is a new instruction according to the information of the received instruction. As for how the conversion program 145 determines whether the received instruction is a new instruction, the details have been described in the first embodiment, so the details will be omitted.

Figure 13:
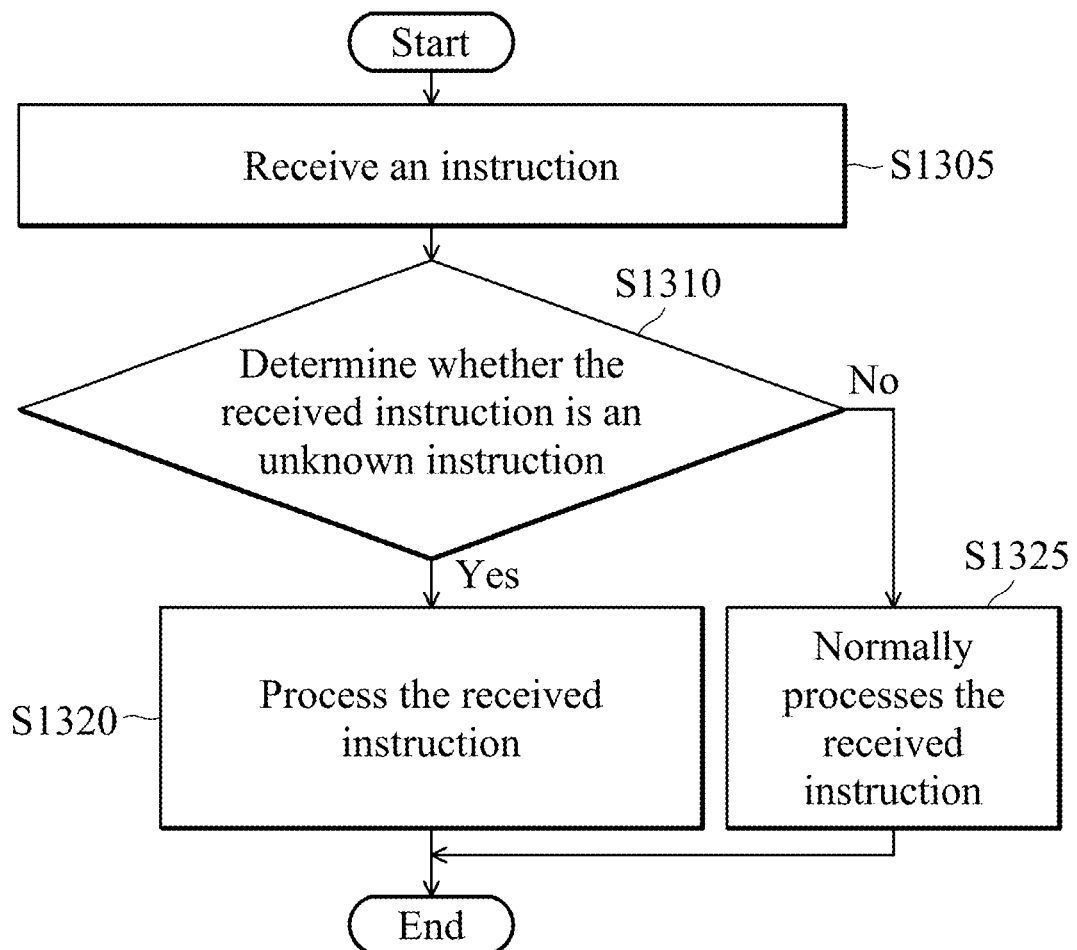
FIG. 13 is a flowchart showing the processing of the received instruction according to the second embodiment of the present disclosure.

FIG. 13 is a flowchart showing the processing of the received instruction according to the second embodiment of the present disclosure. Steps S1305, S1310, and S1325 in FIG. 13 are the same as steps S405, S410, and S435 in FIG. 4, so the details related to steps S1305, S1310, and S1325 will be omitted. Step S1320 is described below.

In step S1320, the processor 1100 in FIG. 11 processes the received instruction. Specifically, when the received instruction is an unknown instruction (the determination result of step S1310 is "Yes"), the processor 1100 executes a microcode handler of the unknown instruction exception. In the microcode handler for handling the unknown instruction exception, the processor 1100 processes the unknown instruction through the conversion program 145 (which will be described in detail later with reference to FIG. 14).

Figure 14:
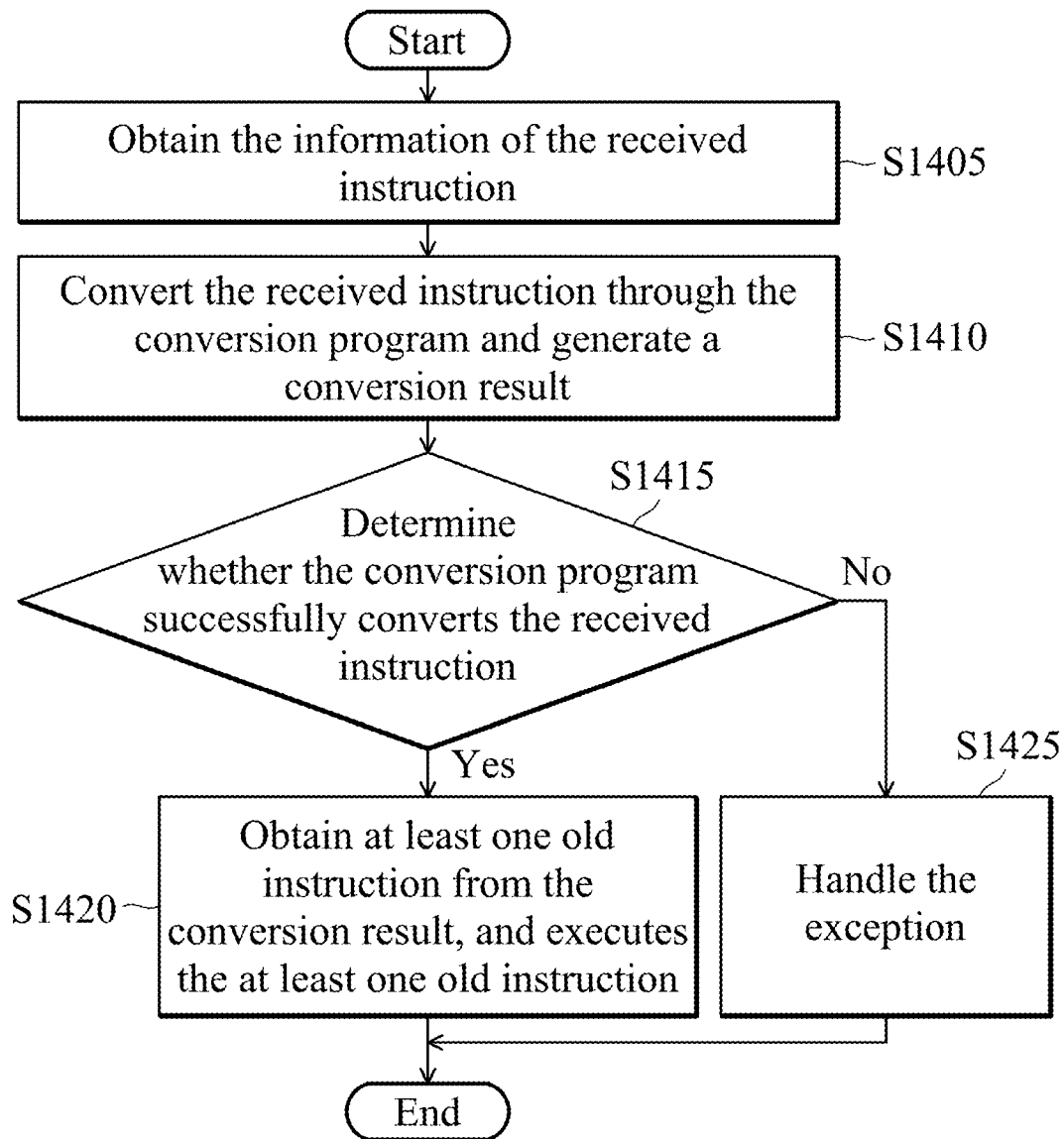
FIG. 14 is a flow chart of processing the received instruction in a microcode handler for handling unknown instruction exceptions according to the second embodiment of the present disclosure.

FIG. 14 is a flow chart of processing the received instruction in a microcode handler for handling unknown instruction exceptions according to the second embodiment of the present disclosure. As shown in FIG. 14, the processor 1100 in FIG. 11 obtains the information of the received instruction (S1405), converts the received instruction through the conversion program 145, and generates a conversion result (S1410). When the conversion program successfully converts the received instruction (the determination result of step S1415 is "Yes"), the processor 1100 obtains at least one old instruction from the conversion result, and executes the at least one old instruction (S1420). The detailed description is as follows: the processor 1100 first executes step S1405.

In step S1405, the processor 1100 obtains the information of the received instruction in the microcode handler of the unknown instruction exception. The information of the received instruction comprises the instruction pointer of the received instruction. It should be noted that since the received instruction has not been decoded at this time, the information of the received instruction does not comprise the decoding information such as prefix, escape code, and operation code. When the microcode handler of the unknown instruction exception is executed, the operating environment of the processor 1100 does not change since the processor 1100 does not need to perform mode conversion. Therefore, in a microcode handler of the unknown instruction exception, the operating environment information of the processor 1100 can be directly obtained, wherein the operating environment information is the operating environment information of the received instruction. Then, step S1410 is executed.

In step S1410, the processor 1100 converts the received instruction through the conversion program 145, and generates a conversion result. As for how to convert the received instruction through the conversion program 145, the processing procedure is the same as that in the first embodiment, so the details related to the processing procedure will be omitted. Step S1415 is the same as step S620 in FIG. 6, so the details related to step S1415 will be omitted. Steps S1420 and S1425 are described below.

When the conversion program 145 successfully converts the received instruction ("Yes" in step S1415), the processor 1100 executes step S1420. In step S1420, the processor 1100 obtains at least one old instruction from the conversion result, and executes the at least one old instruction. In addition, the processor 1100 may also obtain the length of the received instruction from the conversion result. In one embodiment, the next instruction of the received instruction is another received instruction. The final instruction in the at least one old instruction is a jump instruction (jmp) or a call instruction (call), and the processor 1100 jumps to the another received instruction through the jump instruction or the call instruction. The instruction pointer of the another received instruction is: EIP+Length, wherein EIP is the instruction pointer of the received instruction, and Length is the length of the received instruction.

When the conversion program 145 fails to convert the received instruction ("No" in step S1415), the processor 1100 executes step S1425. In step S1425, the processor 1100 handles the exception. Specifically, when any exception occurs when the conversion program 145 converts the received instruction, it will cause the conversion program 145 to fail to convert the received instruction. In the microcode handler of the interrupt preprocessing unit 112 for processing the unknown instruction exception, an exception code is obtained from the content field of the conversion result. Then, the microcode handler that handles the exception of the unknown instruction generates an exception corresponding to the exception code. In response to the exception corresponding to the exception code, the processor 1100 executes the corresponding microcode handler to handle the exception.

The processing flow of the conversion program in the second embodiment is the same as the processing flow of the conversion program in FIG. 7 in the first embodiment, so the details related to the processing flow of the conversion program will be omitted.

In summary, the difference from the first embodiment is that in this embodiment, when the processor 1100 executes an unknown instruction, the processor 1100 directly executes the conversion program 145 in the same execution mode as the unknown instruction. The conversion program 145 determines whether the unknown instruction is a new instruction. When the unknown instruction is a new instruction, the conversion program 145 converts the new instruction into at least one old instruction. Then, the processor 1100 executes the at least one old instruction in the same execution mode as the unknown instruction. Compared with the first embodiment, in this embodiment, the processor does not need to switch the execution mode, so the efficiency of simulating new instructions is higher.

Third Embodiment

Figure 15A:
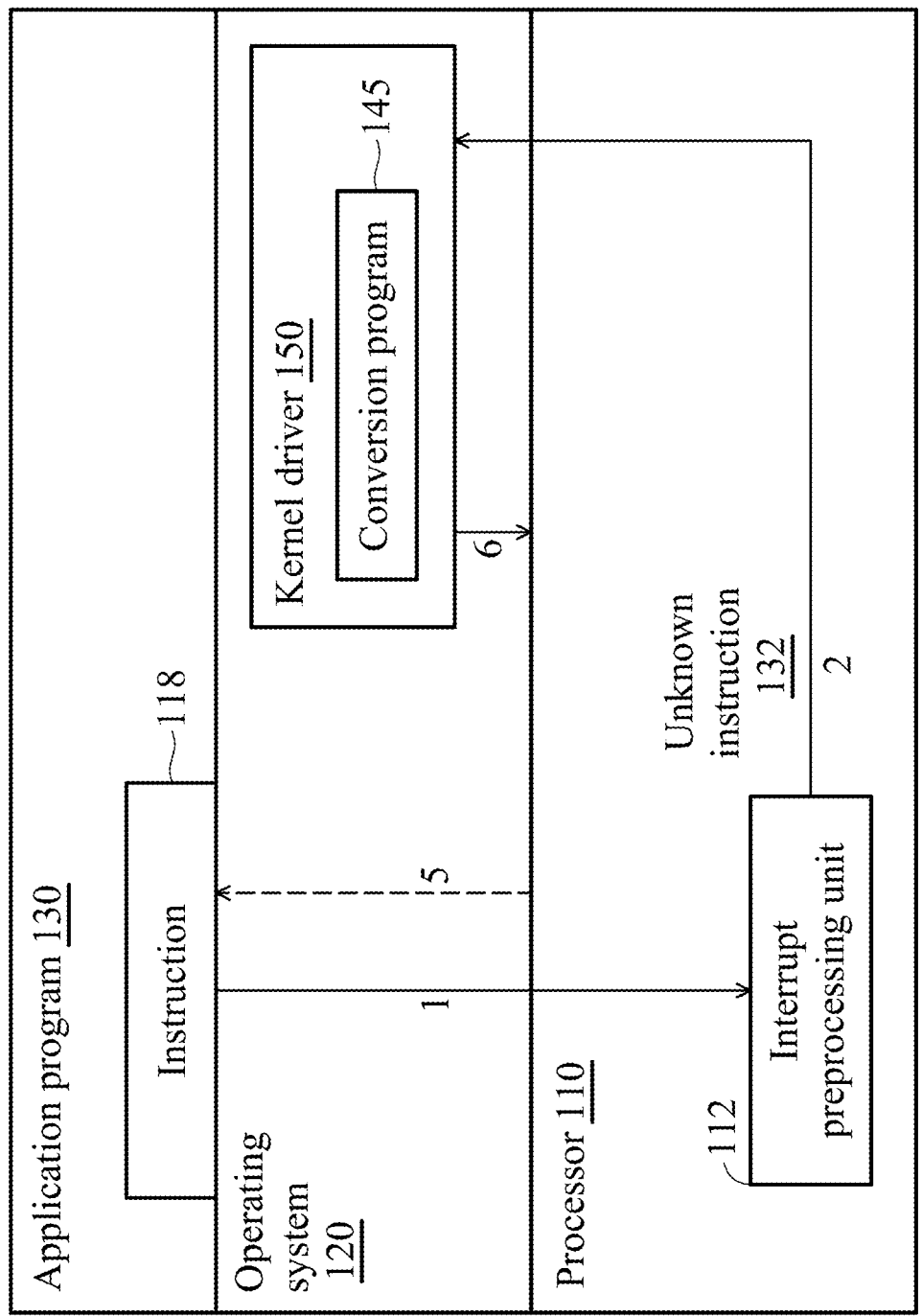
FIGS. 15A to 15B are schematic diagrams showing the system for executing new instructions according to the third embodiment of the present disclosure.
Figure 15B:
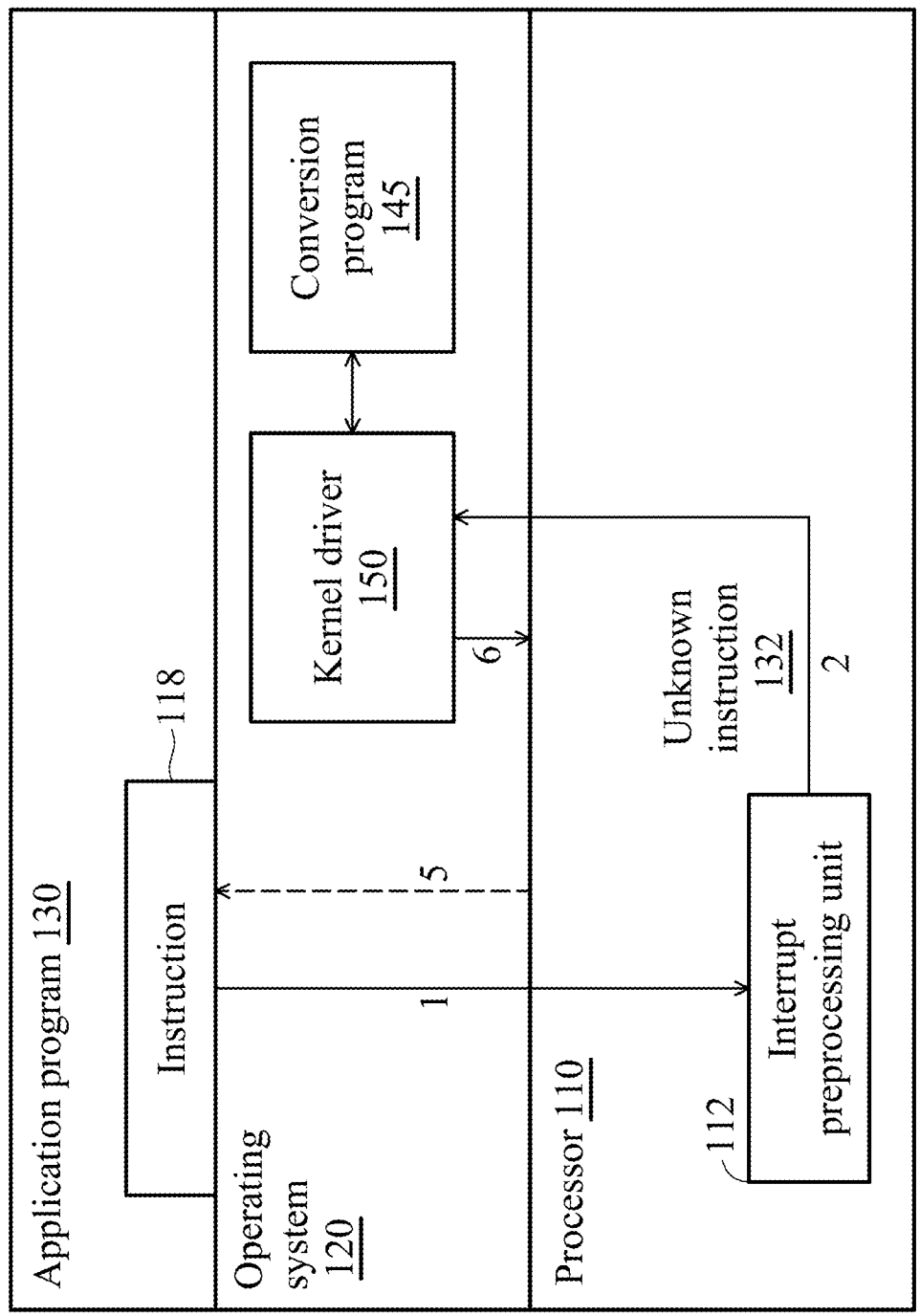

FIGS. 15A to 15B are schematic diagrams showing the system 1500 for executing new instructions according to the third embodiment of the present disclosure. The third embodiment is different from the first embodiment shown in FIG. 1 and the second embodiment shown in FIG. 10 in that the conversion program 145 in the system 1500 for executing new instructions is executed by the kernel driver 150 in the operating system 120. The conversion program 145 may be located at inside (as shown in FIG. 15A) or outside (as shown in FIG. 15B) of the kernel driver 150. Please refer to FIG. 11 and FIGS. 15A to 15B, when the processor 1100 determines that the instruction 118 is an unknown instruction 132, the processor 1100 generates an unknown instruction exception. In response to the unknown instruction exception, the processor 1100 executes a microcode handler of the unknown instruction exception. In the microcode handler of the unknown instruction exception, the processor 1100 calls the kernel driver 150, and sends the information of the unknown instruction 132 and the operating environment information to the kernel driver 150 at the same time. The kernel driver 150 processes the received instruction through the conversion program 145.

In one embodiment, in the microcode handler of the unknown instruction exception, the processor 1100 calls the kernel driver 150 through a user-defined interrupt service program (Developers of the interrupt service program may call the user-defined interrupt service program through the user-defined interrupt vector #NE (Non-support instruction Emulator), wherein the user-defined interrupt vector #NE is a reserved code in the interrupt vector table). It should be noted that when the interrupt service program calls the kernel driver 150, the processor 1100 must send the information of the unknown instruction 132 (comprising the instruction pointer, etc.) and the operating environment information to the kernel driver 150, or send the storage address of the information of the unknown instruction 132 and the operating environment information to the kernel driver 150. Furthermore, the interrupt service program used by the kernel driver 150 (the interrupt service program corresponding to the user-defined interrupt vector #NE) may be stored in the microcode in the interrupt preprocessing unit 112 and be called by the interrupt preprocessing unit 112 (the interrupt preprocessing unit 112 can be constructed with a state machine or a combinational logic circuit). In one embodiment, the kernel driver 150 processes the unknown instruction 132 through the conversion program 145, by calling the operating system 120 through a system call to execute the kernel driver 150. For example, the kernel driver 150 is used as a callback function, and the information of the unknown instruction 132 and the operating environment information are sent to the kernel driver 150 as parameters. When the unknown instruction 132 is a new instruction, the kernel driver 150 returns at least one old instruction to the processor 1100 after processing the unknown instruction 132 through the conversion program 145. In addition, the kernel driver 150 is called either through an internal interrupt or a trap. For example, the designer of the processor 1100 defines an interrupt vector #NE to enter the kernel of the operating system and call the kernel driver 150, and those skilled in the art should know the technical details of this part, so the details of this part will be omitted. In one embodiment, the process of sending the information of the unknown instruction 132 and the operating environment information in the microcode handler of the unknown instruction exception is: the information of the unknown instruction 132 and the operating environment information are pushed into the stack, and then the kernel driver 150 obtains the information of the unknown instruction 132 and the operating environment information from the stack.

In another embodiment, the interrupt service program in the operating system that handles the exception of the unknown instruction may be modified to directly call the kernel driver 150 to realize the processing of the unknown instruction 132. In the modified interrupt service program that handles the exception of the unknown instruction, the information of the unknown instruction 132 and the operating environment information may be read first, and the information of the unknown instruction 132 and the operating environment information are transmitted to the kernel driver 150. In this embodiment, there is no need to modify the hardware and/or microcode of the processor, just modify the interrupt service program in the operating system that handles the exception of the unknown instruction to realize the processing of the unknown instruction as described above. It is quite convenient to implement. In actual operation, those skilled in the art can modify the interrupt service program that handles the exception of the unknown instruction to add the function of reading the information of the unknown instruction 132 and the operating environment information, and calling the kernel driver 150. Since the interrupt service programs for handling the exception of the unknown instruction vary depending on the version of the operating system and/or the processor, those skilled in the art may write corresponding codes according to actual conditions.

Figure 16:
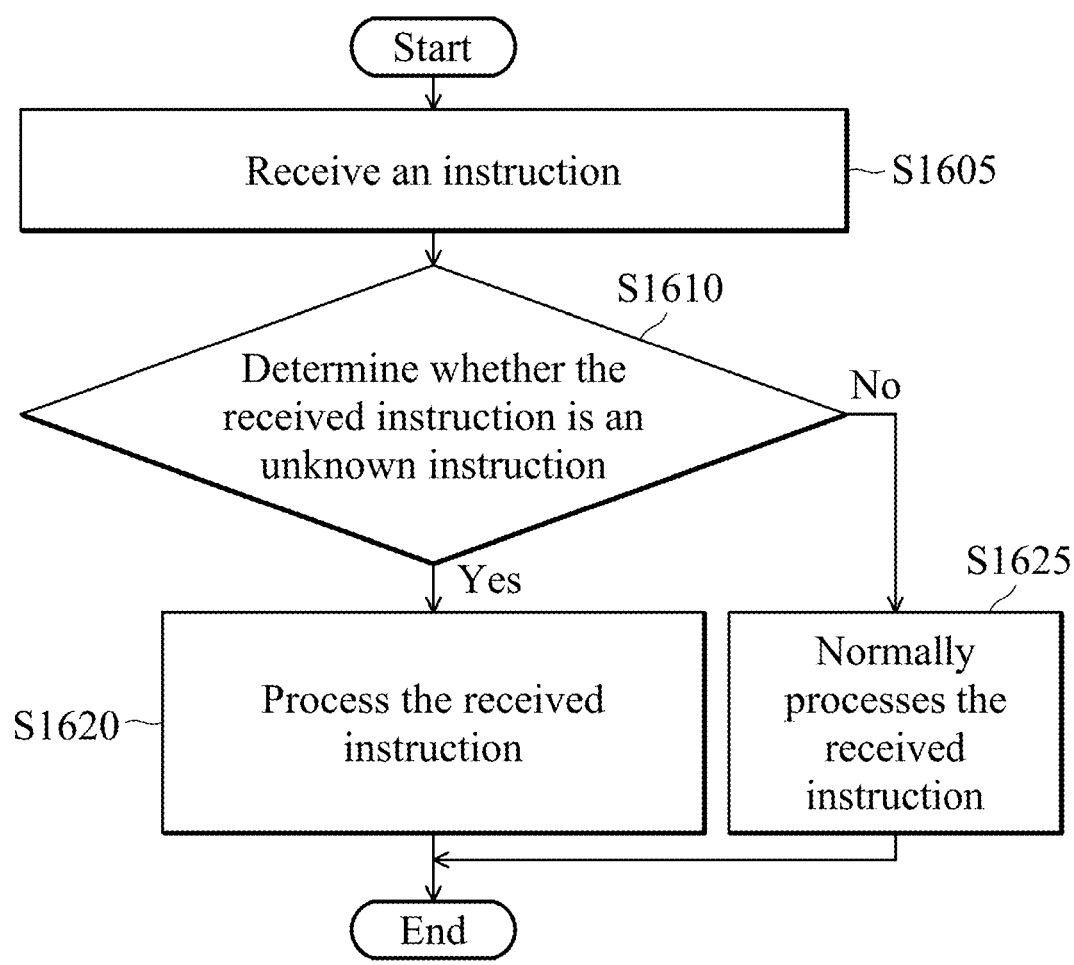
FIG. 16 is a flowchart of processing a received instruction according to another embodiment of the present disclosure.

FIG. 16 is a flowchart of processing a received instruction according to another embodiment of the present disclosure. Steps S1605, S1610, and S1625 in FIG. 16 are the same as steps S1305, S1310, and S1325 in FIG. 13 of the third embodiment, so the details related to steps S1605, S1610, and S1625 will be omitted. The following describes step S1620.

Please refer to FIG. 11, FIGS. 15A~15B, and FIG. 16. The processing flow shown in FIG. 16 may be executed by the processor 1100 in FIG. 11. In step S1620, the processor 1100 processes the received instruction. Specifically, when the received instruction is an unknown instruction, in the microcode handler of the unknown instruction exception, the processor 1100 calls the conversion program 145 to process the received instruction through the kernel driver 150 of the operating system 120. It should be noted that, compared with this embodiment, in step S1320 in FIG. 13 of the second embodiment, when the received instruction is an unknown instruction, the processor 1100 directly processes the received instruction through the conversion program 145 in the microcode handler of the unknown instruction exception.

In one embodiment, the conversion program 145 is a driver or application program of the operating system 120. Other processing procedures in the third embodiment are the same as those in the second embodiment, so the details related to the processing procedures will be omitted.

In summary, the difference from the second embodiment is that in this embodiment (the third embodiment), when the processor 1100 executes an unknown instruction, the microcode handler of the unknown instruction exception executes the kernel driver 150 of the operating system 120 to continue processing the new instructions. Compared with the second embodiment, in this embodiment, the kernel driver of the operating system is used to convert the new instructions through the conversion program. Compared with updating the hardware of the processor and/or the microcode in the processor, updating the kernel drivers and conversion programs are more convenient and faster, thereby improving development efficiency.

Fourth Embodiment

Figure 17:
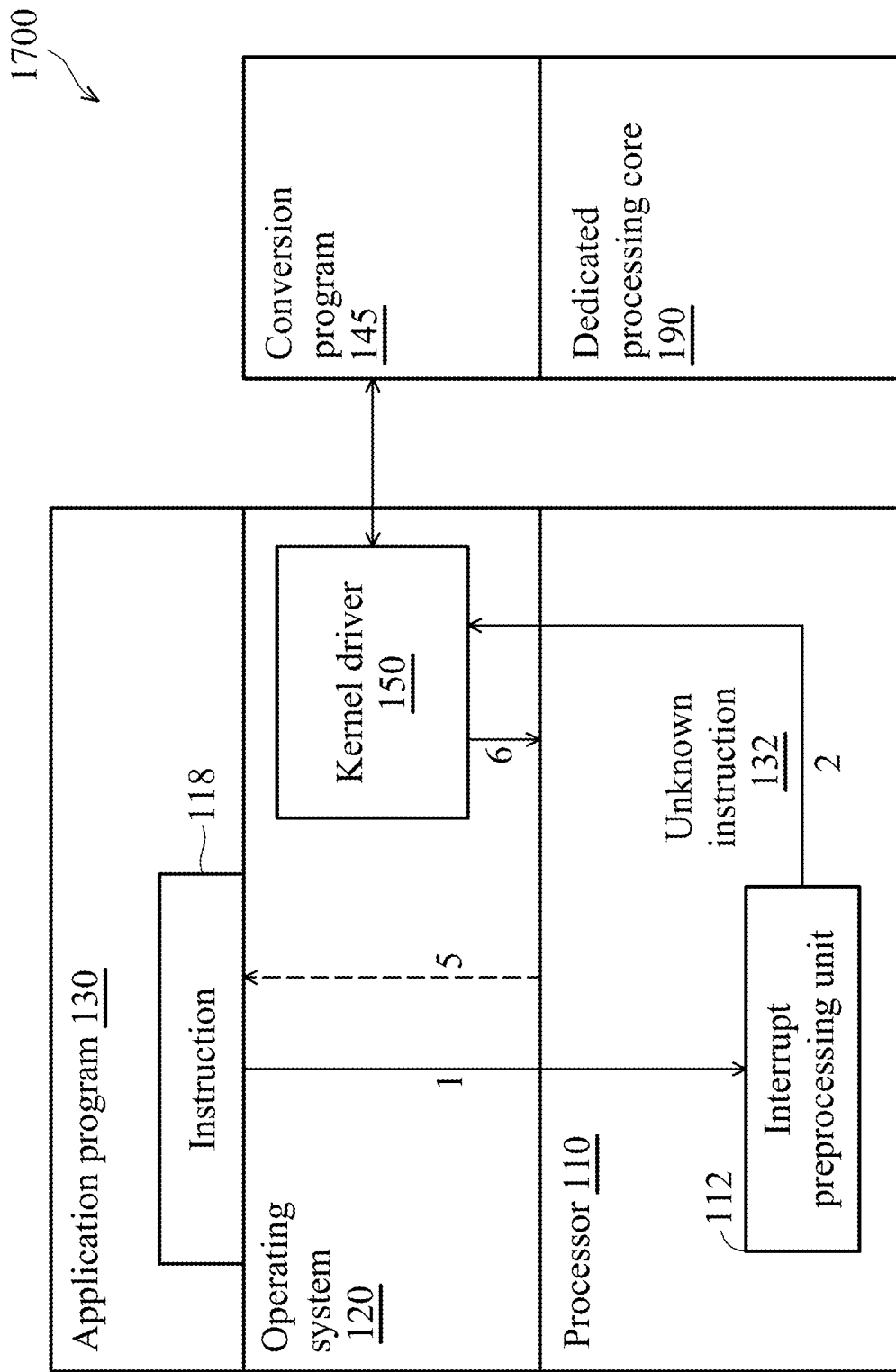
FIG. 17 is a schematic diagram of a system for executing new instructions according to the fourth embodiment of the present disclosure.

FIG. 17 is a schematic diagram of a system 1700 for executing new instructions according to the fourth embodiment of the present disclosure. Similar to the third embodiment, in this embodiment (fourth embodiment), the conversion program 145 in the system 1700 for executing new instructions is also called by the kernel driver 150 in the operating system 120. The difference is that, in this embodiment, the conversion program 145 runs on a dedicated processing core 190. The kernel driver 150 sends the information of the unknown instruction 132 and the operating environment information to the conversion program 145 through a polling or doorbell mechanism. The conversion program 145 also needs to send the conversion result to the kernel driver 150 through the polling or doorbell mechanism. The following will separately describe how to transfer data between the kernel driver 150 and the conversion program 145 through the polling or doorbell mechanism.

The polling mechanism is first described below. Referring to FIGS. 11 and 17, in one embodiment, the designer of the processor 1100 may set a transmission register (not shown in FIGS. 11 and 17) in the uncore of the processor 1100 for storing the information of the unknown instructions 132, the operating environment information, a transmission information flag, and a transmission result flag (not shown in FIG. 17), wherein the default values of the transmission information flag and the transmission result flag are both the second value. The kernel driver 150 stores the information of the unknown instruction 132 and the operating environment information in the transmission register, and stores the transmission information flag of the first value in the transmission register. Then, the kernel driver 150 reads the transmission result flag in the transmission register at regular intervals (for example, every 100 milliseconds) to wait for the conversion result to be received. When the transmission result flag read by the kernel driver 150 is the first value, it means that the conversion program 145 has generated the conversion result, and the kernel driver 150 may read the conversion result from the transmission register. In addition, the conversion program 145 running on the dedicated processing core 190 is set to check whether the transmission information flag in the transmission register is the first value at regular intervals (for example, every 100 milliseconds) when the conversion program 145 is idle. When the transmission information flag in the transmission register is the first value, the conversion program 145 reads the information of the unknown instruction 132 and the operating environment information from the transmission register, and then sets the transmission information flag in the transmission register to the second value. Then, the conversion program 145 performs the conversion processing on the unknown instruction 132 according to the method described above, and generates a conversion result. Then, the conversion program 145 stores the conversion result in the transmission register, and stores the transmission result flag whose value is the first value in the transmission register. As mentioned above, since the transmission result flag is the first value, the kernel driver 150 may read the conversion result from the transmission register and set the transmission result flag in the transmission register to the second value. Therefore, a data transmission is completed between the kernel driver 150 and the conversion program 145. In another embodiment, under the multi-core processor architecture, it is also necessary to store the number of the processing core in the transmission register or allocate dedicated storage space for each processing core in the transmission register, so that the kernel driver 150 running on each processing core can transmit data with the conversion program 145.

The doorbell mechanism is described below. Also referring to FIGS. 11 and 17, in one embodiment, the designer of the processor 1100 may set a transmission register (not shown in FIGS. 11 and 17) in the uncore of the processor 1100 to store the information of the unknown instruction 132 and the operating environment information (not shown in FIG. 17). After the kernel driver 150 stores the information of the unknown instruction 132 and the operating environment information in the transmission register, the kernel driver 150 notifies the conversion program 145 running on the dedicated processing core 190 through an interrupt. In response to the interrupt, the conversion program 145 reads the information of the unknown instruction 132 and the operating environment information from the transmission register, and generates the conversion result. Then, the conversion program 145 stores the conversion result in the transmission register, and informs the kernel driver 150 through an interrupt. In response to the interrupt, the kernel driver 150 reads the conversion result from the transmission register. Therefore, a data transmission is completed between the kernel driver 150 and the conversion program 145. As for how to set interrupts, for example, define the interrupt service programs for the kernel driver 150 and the conversion program 145, and define corresponding codes of the interrupt vectors, have been described above, so the details related to how to set interrupts will be omitted. In another embodiment, a hardware interrupt signal line (PIN) may also be added to the processor 1100 and/or the dedicated processing core 190 separately, and the kernel driver 150 and/or the conversion program 145 may trigger an interrupt through the hardware interrupt signal line to complete the data transmission.

Other processing procedures in this embodiment are the same as those in the third embodiment, so the details related to processing procedures will be omitted.

In another embodiment, the functions of the conversion program 145 described in the first, second, and fourth embodiments may be implemented in a hardware circuit.

As shown above, similar to the third embodiment, in this embodiment, the conversion of the new instructions is also performed by the kernel driver 150 of the operating system 120. The difference from the third embodiment is that, in this embodiment, the conversion program 145 runs on the dedicated processing core 190. In this embodiment, since the conversion program 145 runs on the dedicated processing core 190, the execution speed is faster. In addition, since there is no need to execute a conversion program 145 in each processing core, the workload of other processing cores of the processor is reduced.

Figure 18:
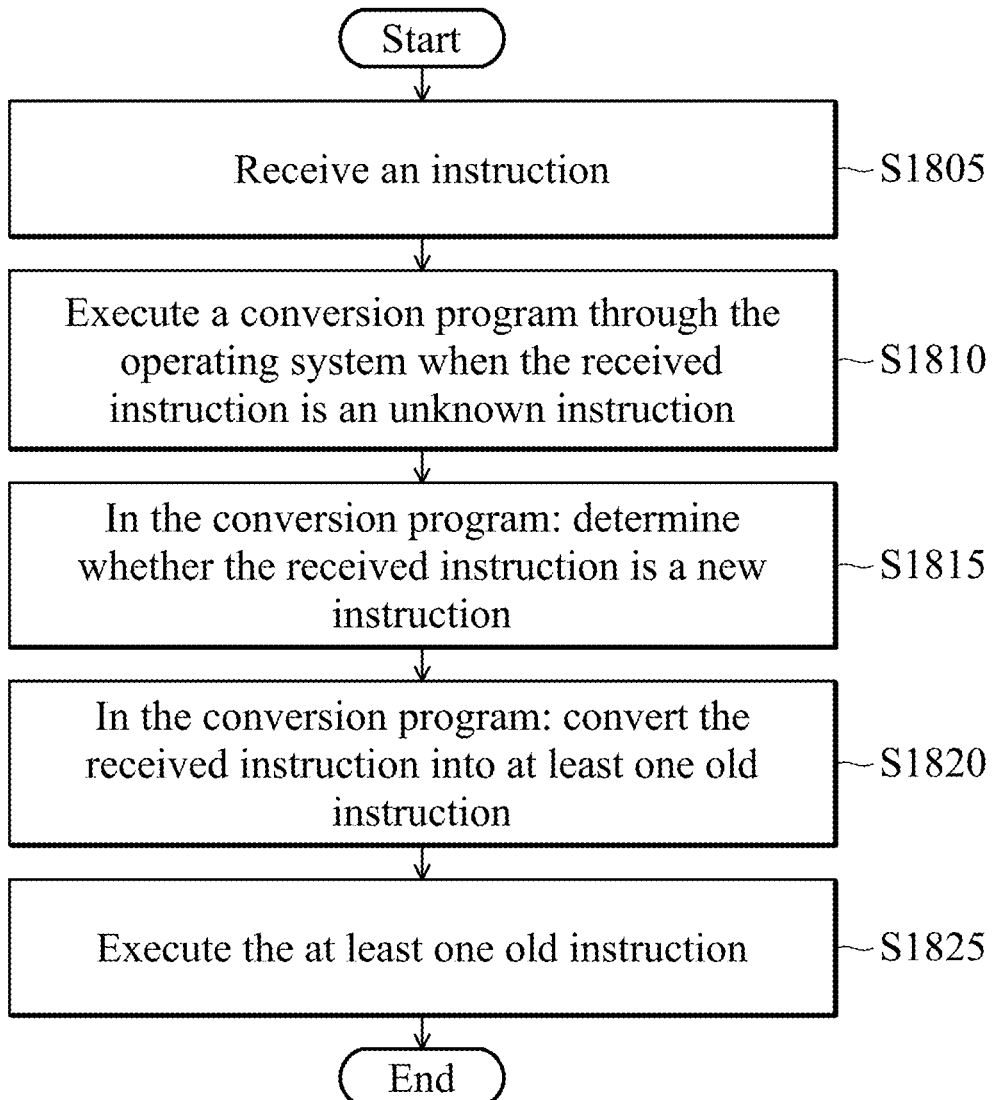
FIG. 18 shows a flowchart of executing a new instruction according to an embodiment of the present disclosure.

FIG. 18 shows a flowchart of executing a new instruction according to an embodiment of the present disclosure. Please refer to FIGS. 11, 17, and 18. As described in the third embodiment and this embodiment, the processor 1100 receives an instruction (S1805). When the received instruction is an unknown instruction, the processor 1100 executes a conversion program through the operating system 120 (S1810). In the conversion program, the processor 1100 determines whether the received instruction is a new instruction (S1815), and converts the received instruction into at least one old instruction when the received instruction is a new instruction (S1820). Finally, the processor 1100 executes the at least one old instruction (S1825). Steps S1805, S1815, S1820, and S1825 in FIG. 18 have been described in detail in the first embodiment, so the details related to steps S1805, S1815, S1820, and S1825 will be omitted. Step S1810 is described below.

In step S1810, when the received instruction is an unknown instruction, the processor 1100 executes a conversion program through the operating system. Specifically, as shown in the description of the third embodiment and this embodiment, when the received instruction is an unknown instruction, the instruction retiring unit 245 generates an unknown instruction exception. In response to the unknown instruction exception, the processor 1100 executes a microcode handler of the unknown instruction exception. In the microcode handler of the unknown instruction exception, the processor 1100 calls the kernel driver 150 of the operating system. The kernel driver 150 of the operating system then calls the conversion program 145.

Figure 19:
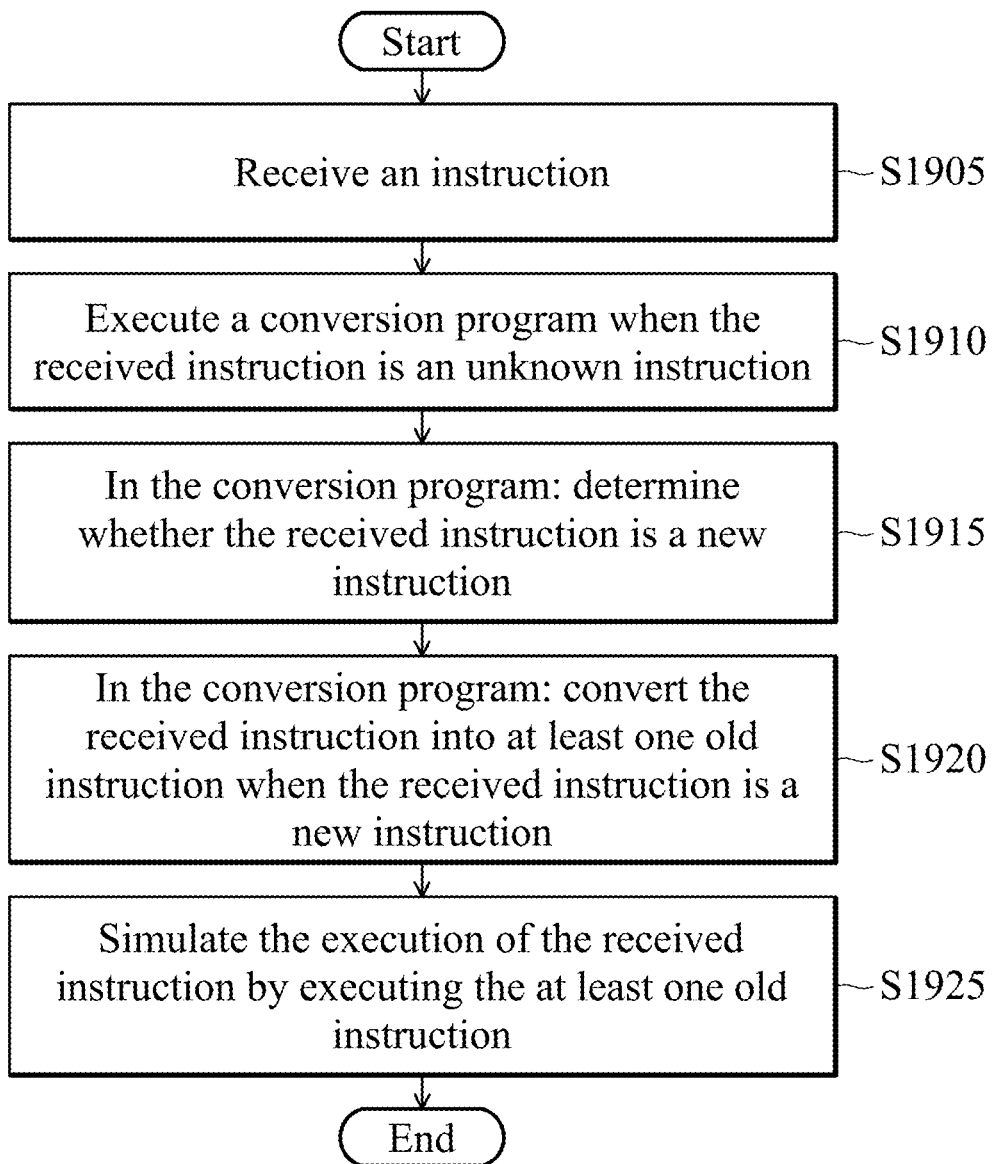
FIG. 19 is a flow chart of executing a new instruction according to an embodiment of the present disclosure.

FIG. 19 is a flow chart of executing a new instruction according to an embodiment of the present disclosure. Please refer to FIGS. 11, 17, and 19. As described in the first, second, third and this embodiment, the processor 1100 receives an instruction (S1905). When the received instruction is an unknown instruction, the processor 1100 executes a conversion program (S1910). In the conversion program, the processor 1100 determines whether the received instruction is a new instruction (S1915), and converts the received instruction into at least one old instruction when the received instruction is a new instruction (S1920). Finally, the processor 1100 simulates the execution of the received instruction by executing the at least one old instruction (S1925). Steps S1905, S1915, S1920, and S1925 in FIG. 19 have been described in detail in the first embodiment, so the details related to steps S1905, S1915, S1920, and S1925 will be omitted. Next, step S1910 is described.

In step S1910, when the received instruction is an unknown instruction, the processor 1100 executes a conversion program. Specifically, as described in the first embodiment, the second embodiment, the third embodiment, and the present embodiment, when the received instruction is an unknown instruction, the instruction retiring unit 245 generates an unknown instruction exception. In response to the unknown instruction exception, the processor 1100 executes a microcode handler of the unknown instruction exception.

Specifically, in the first embodiment, the microcode handler of the unknown instruction exception generates a system management interrupt (#SMI). In response to the system management interrupt, the processor 1100 enters the system management mode. In the system management mode, the processor 1100 executes the simulator 142, and the simulator 142 calls the conversion program 145. In the second embodiment, the microcode handler of the unknown instruction exception directly calls the conversion program 145. In the third embodiment and this embodiment, the microcode handler of the unknown instruction exception calls the kernel driver 150 of the operating system 120. Then the kernel driver 150 of the operating system 120 calls the conversion program 145.

Figure 20:
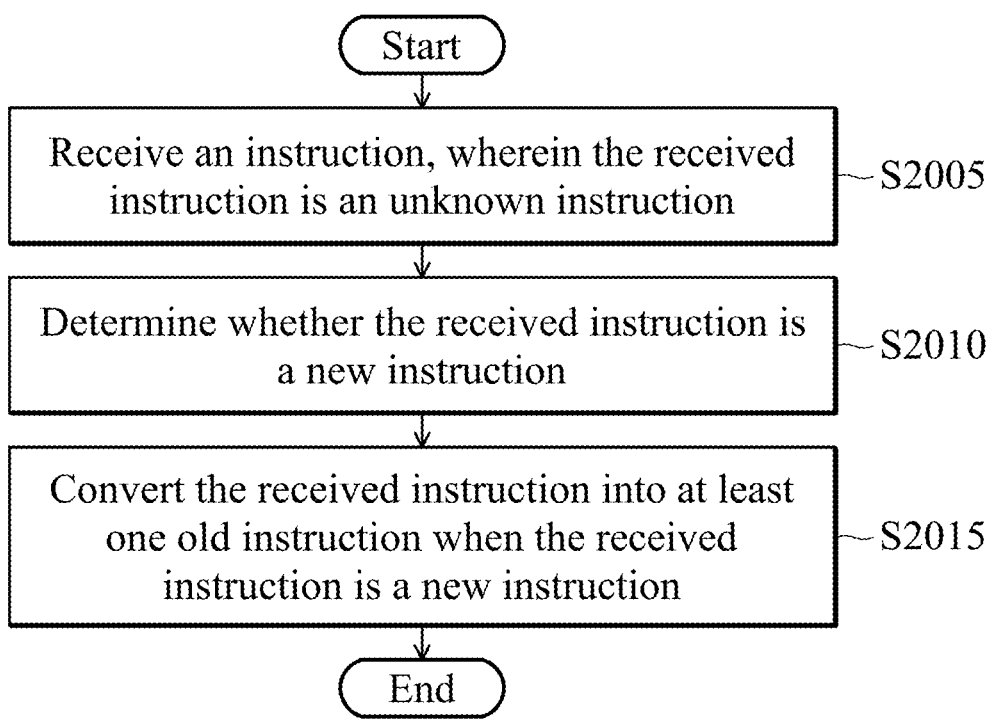
FIG. 20 is a flowchart showing the conversion of the new instruction according to an embodiment of the present disclosure.

FIG. 20 is a flowchart showing the conversion of the new instruction according to an embodiment of the present disclosure. Please refer to FIGS. 11, 17, and 20. As shown in the description of the first, second, third and this embodiment, the conversion program 145 receives an instruction, wherein the received instruction is an unknown instruction (S2005), and determines whether the received instruction is a new instruction (S2010). When the received instruction is a new instruction, the conversion program 145 converts the received instruction into at least one old instruction (S2015). In the foregoing, steps S2005, S2010, and S2015 of FIG. 20 have been described in detail, so the details related to steps S2005, S2010, and S2015 will be omitted.

Figure 21:
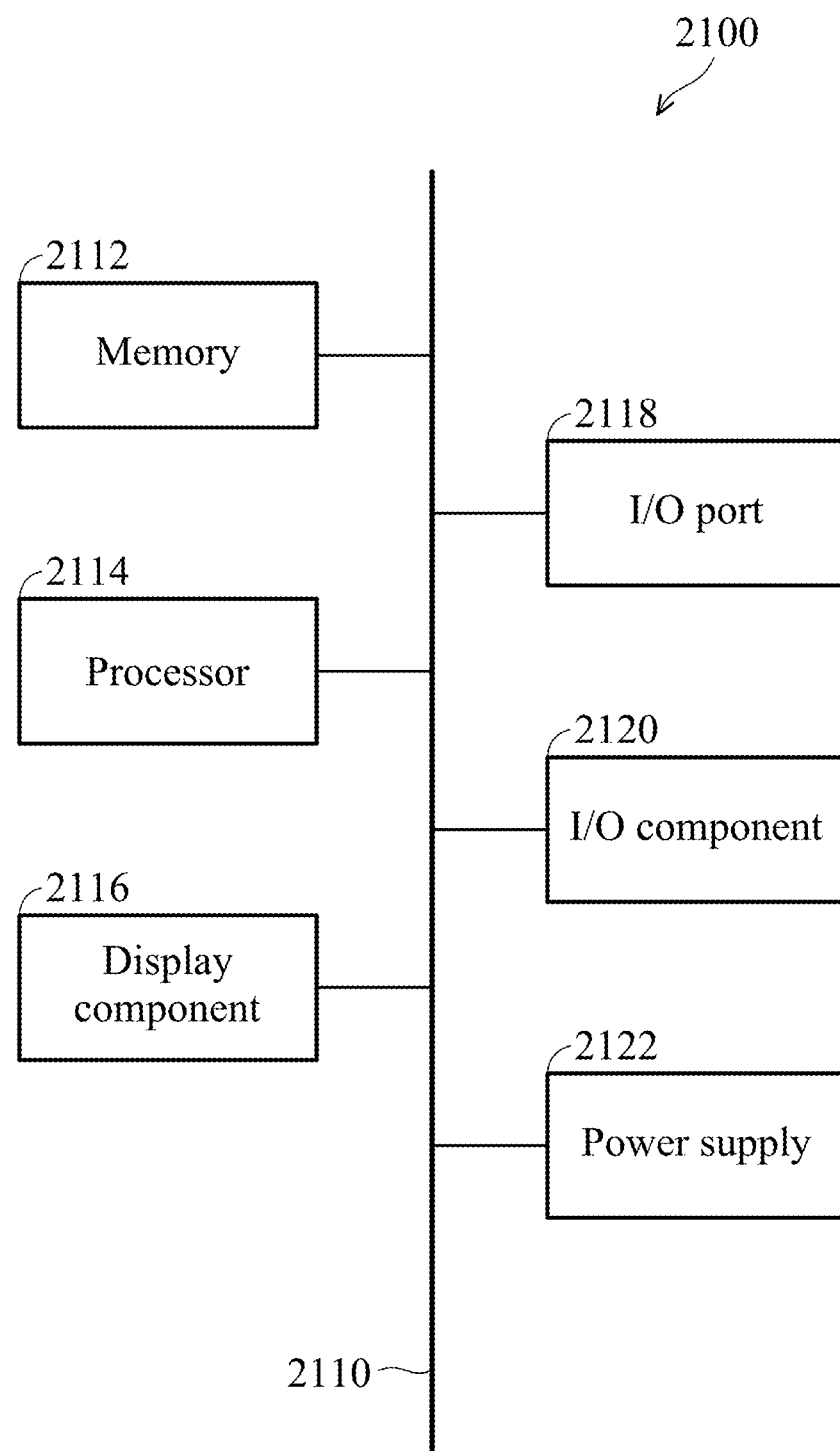
FIG. 21 illustrates an exemplary operating environment for implementing embodiments of the present disclosure.

Having described embodiments of the present disclosure, an exemplary operating environment in which embodiments of the present disclosure may be implemented is described below. Referring to FIG. 21, an exemplary operating environment for implementing embodiments of the present disclosure is shown and generally known as a computing device 2100. The computing device 2100 is merely an example of a suitable computing environment and is not intended to limit the scope of use or functionality of the disclosure. Neither should the computing device 2100 be interpreted as having any dependency or requirement relating to any one or combination of components illustrated.

The disclosure may be realized by means of the computer or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including handheld devices, consumer electronics, general-purpose computers, more specialty computing devices, etc. The disclosure may also be implemented in distributed computing environments where tasks are performed by remote-processing devices that are linked by a communication network.

With reference to FIG. 21, the computing device 2100 may include a bus 2110 that is directly or indirectly coupled to the following devices: one or more memories 2112, one or more processors 2114, one or more display components 2116, one or more input/output (I/O) ports 2118, one or more input/output components 2120, and an power supply 2122. The bus 2110 may be one or more kinds of busses (such as an address bus, data bus, or any combination thereof). Although the various blocks of FIG. 21 are shown with lines for the sake of clarity, and in reality, the boundaries of the various components are not specific. For example, the display component such as a display device may be considered an I/O component and the processor may include a memory.

The computing device 2100 typically includes a variety of computer-readable media. The computer-readable media can be any available media that can be accessed by computing device 2100 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 2100. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 2112 may include computer-storage media in the form of volatile and/or nonvolatile memory. The memory may be removable, non-removable, or a combination thereof. Exemplary hardware devices include solid-state memory, hard drives, optical-disc drives, etc. The system management memory in the first embodiment is located in the memory 2112.

The computing device 2100 includes one or more processors 2114 that read data from various entities such as the memory 2112 or the I/O components 2120. The display component(s) 2116 present data indications to a user or to another device. Exemplary presentation components include a display device, speaker, printing component, vibrating component, etc.

The I/O ports 2118 allow the computing device 2100 to be logically coupled to other devices including the I/O components 2120, some of which may be embedded. Illustrative components include a microphone, joystick, game pad, satellite dish, scanner, printer, wireless device, etc. The I/O components 2120 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 2100, or any combination thereof. The computing device 2100 may be equipped with depth cameras, such as stereoscopic camera systems, infrared camera systems, RGB camera systems, or any combination thereof, to realize gesture detection and recognition. Furthermore, the computing device 2100 may be equipped with accelerometers or gyroscopes that enable detection of motion. The output of the accelerometers or gyroscopes may be provided to the display of the computing device 2100 to carry out immersive augmented reality or virtual reality.

Furthermore, the processor 2114 in the computing device 2100 can execute the program code in the memory 2112 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Through the method for executing new instructions and the system for executing new instructions provided by the present disclosure, the new instructions can be executed on the previous-generation processor without modifying the hardware architecture of the processing core.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for executing new instructions, used in a first type of processor, comprising:
    receiving an instruction;
    when the received instruction is an unknown instruction, the processor executes the following steps through a conversion program:
    determining whether the received instruction is a new instruction; and
    converting the received instruction into at least one old instruction when the received instruction is a new instruction, wherein the new instruction is an instruction newly supported by second type of processor, wherein the second type of processor is a subsequent-generation of the first type of processor; and
    simulating the execution of the received instruction by executing the at least one old instruction,
    wherein the unknown instruction is an instruction not natively supported by the first type of processor.

2. The method for executing new instructions as claimed in claim 1, wherein the received instruction is an instruction set architecture instruction, and the at least one old instruction is an instruction set architecture instruction.

3. The method for executing new instructions as claimed in claim 1, wherein the received instruction is an x86 instruction, an ARM instruction, a RISC-V instruction, or a MIPS instruction, and the at least one old instruction is an x86 instruction, an ARM instruction, a RISC-V instruction, or a MIPS instruction.

4. The method for executing new instructions as claimed in claim 1, further comprising:
    obtaining a machine code of the received instruction according to an instruction pointer of the received instruction;
    decoding the machine code to obtain an operation code of the received instruction; and
    determining whether the received instruction is a new instruction according to the operation code.

5. The method for executing new instructions as claimed in claim 4, further comprising:
    generating the at least one old instruction according to the operation code; and
    executing the at least one old instruction.

6. The method for executing new instructions as claimed in claim 4, wherein when the received instruction is a new instruction, the method further comprises:
    decoding the machine codes to obtain other decoding information of the received instruction, wherein the other decoding information comprises a source operand and a destination operand; and
    executing the at least one old instruction according to the other decoding information.

7. The method for executing new instructions as claimed in claim 4, further comprising:
    generating an unknown instruction exception when the received instruction is not a new instruction.

8. The method for executing new instructions as claimed in claim 1, further comprising:
    storing the at least one old instruction in a memory or a cache.

9. The method for executing new instructions as claimed in claim 8, further comprising:
    reading the at least one old instruction from the memory or the cache;
    decoding the at least one old instruction into at least one microinstruction; and
    executing the at least one microinstruction.

10. The method for executing new instructions as claimed in claim 8, further comprising:
    when another received instruction is an unknown instruction, the conversion program executes the following steps:
    determining whether the received instruction and the another received instruction are the same instruction when the another received instruction is a new instruction; and
    obtaining the at least one old instruction from the memory or the cache when the received instruction and the another received instruction are the same instruction; and
    executing the at least one old instruction.

11. The method for executing new instructions as claimed in claim 1, wherein when the received instruction is a new instruction, the method further comprises:
    calculating a length of the received instruction; and
    executing another received instruction after executing the at least one old instruction, wherein an instruction pointer of the another received instruction is: EIP+Length, wherein EIP is an instruction pointer of the received instruction, and Length is the length.

12. The method for executing new instructions as claimed in claim 11, wherein a final instruction in the at least one old instruction is a jump instruction, and the method further comprises:
    jumping to the another received instruction through the jump instruction.

13. The method for executing new instructions as claimed in claim 11, wherein a final instruction in the at least one old instruction is a call instruction, and the method further comprises:
   jumping to the another received instruction through the call instruction.

14. A system for executing new instructions in a first type of processor, comprising:
   an instruction decoding unit, receiving an instruction, and determining whether the received instruction is an unknown instruction, wherein the unknown instruction is an instruction not natively supported by the first type of processor;
   when the received instruction is an unknown instruction, the system for executing the new instructions uses a conversion program to execute the following steps:
   converting the received instruction into at least one old instruction when the received instruction is a new instruction, wherein the new instruction is an instruction newly supported by a second type of processor, wherein the second type of processor is a subsequent-generation of the first type of processor;
   wherein the system for executing the new instructions simulates the execution of the received instruction by executing the at least one old instruction.

15. The system for executing new instructions as claimed in claim 14, wherein the received instruction is an instruction set architecture instruction, and the at least one old instruction is an instruction set architecture instruction.

16. The system for executing new instructions as claimed in claim 14, wherein the received instruction is an x86 instruction, an ARM instruction, a RISC-V instruction, or a MIPS instruction, and the at least one old instruction is an x86 instruction, an ARM instruction, a RISC-V instruction, or a MIPS instruction.

17. The system for executing new instructions as claimed in claim 14, wherein the system for executing new instructions obtains machine code of the received instruction according to an instruction pointer of the received instruction, decodes the machine code to obtain an operation code of the received instruction, and determines whether the received instruction is a new instruction according to the operation code.

18. The system for executing new instructions as claimed in claim 17, wherein when the received instruction is a new instruction, the system for executing new instructions generates the at least one old instruction according to the operation code, and executes the at least one old instruction.

19. The system for executing new instructions as claimed in claim 17, wherein the system for executing new instructions decodes the machine code to obtain other decoding information of the received instruction, wherein the other decoding information comprises a source operand and a destination operand; and the system for executing new instructions executes the at least one old instruction according to the other decoding information.

20. The system for executing new instructions as claimed in claim 17, wherein the system for executing new instructions generates an unknown instruction exception when the received instruction is not a new instruction.

21. The system for executing new instructions as claimed in claim 14, wherein the system for executing new instructions stores the at least one old instruction in a memory or a cache.

22. The system for executing new instructions as claimed in claim 21, wherein the system for executing new instructions reads the at least one old instruction from the memory or the cache, decodes the at least one old instruction into at least one microinstruction, and executes the at least one microinstruction.

23. The system for executing new instructions as claimed in claim 21, wherein when another received instruction is an unknown instruction, the system for executing new instructions executes the following steps through the conversion program:
   determining whether the received instruction and the another received instruction are the same instruction when the another received instruction is a new instruction; and
   obtaining the at least one old instruction from the memory or the cache when the received instruction and the another received instruction are the same instruction; and
   the system for executing new instructions executes the at least one old instruction.

24. The system for executing new instructions as claimed in claim 14, wherein when the received instruction is a new instruction, the system for executing new instructions calculates a length of the received instruction, and executes another received instruction after executing the at least one old instruction, wherein an instruction pointer of the another received instruction is: EIP+Length, wherein EIP is an instruction pointer of the received instruction, and Length is the length.

25. The system for executing new instructions as claimed in claim 24, wherein a final instruction in the at least one old instruction is a jump instruction, and the system for executing new instructions jumps to the another received instruction through the jump instruction.

26. The system for executing new instructions as claimed in claim 24, wherein a final instruction in the at least one old instruction is a call instruction, and the system for executing new instructions jumps to the another received instruction through the call instruction.

* * * * *